United States Patent
Amorai-Moriya et al.

(10) Patent No.: US 6,484,131 B1
(45) Date of Patent: Nov. 19, 2002

(54) LOCALIZATION AND TRACKING SYSTEM

(75) Inventors: Netzer Amorai-Moriya, Ramat Hasharon; Mordechai Itzkovich, Petach Tikva; Yehuda Albeck, Ma'ale Adumim; Boaz Spivak, Petach Tikva, all of (IL)

(73) Assignee: Netmor Ltd., Ramat Hasharon (IL)

( * ) Notice: Subject to any disclaimer, the term of this patent is extended or adjusted under 35 U.S.C. 154(b) by 0 days.

(21) Appl. No.: 09/384,314

(22) Filed: Aug. 27, 1999

(51) Int. Cl.⁷ .............................................. G06F 17/50
(52) U.S. Cl. ...................................... 702/189; 701/223
(58) Field of Search ............................... 702/189, 191, 702/195; 382/103, 106, 107, 154, 320; 701/207, 214, 223; 324/301–302, 331, 332, 200, 202, 345, 758

(56) References Cited

U.S. PATENT DOCUMENTS

| | | | |
|---|---|---|---|
| 3,935,572 A | 1/1976 | Broniwitz et al. ............. 343/9 |
| 3,952,304 A | 4/1976 | Broniwitz et al. ....... 343/16 M |
| 4,179,696 A | 12/1979 | Quesinberry et al. ......... 343/7.4 |
| 4,725,776 A | * 2/1988 | Onodera et al. ............ 324/208 |
| 4,855,932 A | 8/1989 | Cangiani et al. ............ 364/516 |
| 5,075,694 A | 12/1991 | Donnangelo et al. ....... 342/455 |
| 5,095,467 A | 3/1992 | Olson et al. ................. 367/125 |
| 5,313,212 A | * 5/1994 | Ruzicka ....................... 342/101 |
| 5,381,095 A | * 1/1995 | Andrews ..................... 324/326 |
| 5,416,712 A | 5/1995 | Geier et al. .................. 364/450 |
| 5,645,077 A | 7/1997 | Foxlin ......................... 128/774 |
| 5,833,608 A | * 11/1998 | Acker .......................... 600/409 |
| 5,859,531 A | * 1/1999 | Maurice et al. ............. 342/207 |
| 5,960,097 A | * 9/1999 | Pfeiffer et al. .............. 382/103 |
| 6,073,043 A | * 6/2000 | Schneider ................... 600/424 |
| 6,114,995 A | * 9/2000 | Ketchum .................... 342/457 |
| 6,230,037 B1 | * 5/2001 | Tsukada et al. ............. 600/409 |
| 6,269,172 B1 | * 7/2001 | Rehg et al. .................. 382/103 |
| 6,269,324 B1 | * 7/2001 | Rakijas et al. .............. 702/190 |
| 6,292,758 B1 | * 9/2001 | Gilbert et al. .............. 702/150 |

OTHER PUBLICATIONS

Harold J. Kushner, "Approximations to Optimal Nonlinear Filters," *IEEE Transactions on Automated Control*, vol. AC–21, No. 5, Oct. 1967.

Arthur Gelb, *Applied Optimal Estimation*, The M.I.T. Press, Cambridge, MA, 1974, Chapter 1, pp. 1–7.

Brian D. O. Anderson and John B. Moore, *Optimal Filtering*, Prentice–Hall, Inc., Englewood Cliffs, New Jersey, 1979, Chapter 1 and 1, pp. 1–16.

J. D. Jackson, *Classical Electrodynamics*, John Wiley & Sons, 2nd Edition, New York, 1975, Chapter 6, pp. 209–268.

Andrew H. Jazwinski, *Stochastic Processes and Filtering Theory*, Academic Press, New York, 1970, Chapters 1 and 2, pp. 1–13.

Mohinder S. Grewal and Angus P. Andrew, *Kalman Filtering*, Prentice Hall, Upper Saddle River, New Jersey, 1993.

* cited by examiner

*Primary Examiner*—Marc S. Hoff
*Assistant Examiner*—Edward Raymond
(74) *Attorney, Agent, or Firm*—Townsend and Townsend and Crew LLP

(57) ABSTRACT

This invention discloses a pose tracking apparatus operative to track the pose of a moving object based on magnetic flux measurements taken in the vicinity of the moving object. The pose tracking apparatus includes a non-linear Kalman filter-based tracker. The tracker is operated to receive magnetic flux measurements performed in the vicinity of the moving object, and to operate a non-linear Kalman-type filter on said measurements, thereby to generate information regarding the pose of the moving object. In addition, the pose tracking apparatus includes a pose indicator operative to provide an output indication of the information regarding the pose of the moving object.

74 Claims, 9 Drawing Sheets

LOCALIZATION AND TRACKING SYSTEM

FIELD OF THE INVENTION

The present invention relates to apparatus for localization and tracking.

BACKGROUND OF THE INVENTION

The theory of non-linear filtering and its applications are discussed in:

H. J. Kushner, "Approximations to Optimal Nonlinear Filters". IEEE Trans. A.C., Vol. AC-12, No. 5, October 1967;

A. Gelb, J. F. Kaspar, Jr., R. A. Nash, Jr., C. E. Price, and A. A. Southerland, Jr., "Applied Optimal Estimation", M.I.T. Press, Cambridge, Mass., 1974;

B. D. O. Anderson, and J. B. Moore, "Optimal Filtering", Prentice-Hall, Englewood Cliffs, N.J., 1979;

A. H. Jazwinski, "Stochastic Processes and Filtering Theory", Academic Press, New York, 1971; and M. S. Grewal, and A. P. Andrews, "Kalman Filtering", Prentice-Hall, Upper Saddle River, N.J., 1993.

The Biot-Savart law is discussed in:

J. D. Jackson, "Classical Electrodynamics", John Willey & Sons, New York, N.Y., 1975.

The application of Extended Kalman Filters (EKF) to tracking in the context of radar is discussed, for example, in U.S. Pat. Nos. 5,075,694, 4,179,696, 3,952,304 and 3,935,572. Other tracking systems are discussed, for example, in U.S. Pat. Nos. 5,095, 467 and 4,855,932.

The Kalman Filter is a standard tool for "data fusion" of different sensors. In U.S. Pat. No. 5,416,712 GPS signals and dead reckoning are combined by a Kalman Filter, and where the gyro bias is also calibrated. In U.S. Pat. No. 5,645,077 automatic drift compensation is discussed.

The disclosures of all publications mentioned in the specification and of the publications cited therein are hereby incorporated by reference.

SUMMARY OF THE INVENTION

The present invention seeks to provide a non-linear Kalman Filter tracker.

There is thus provided in accordance with a preferred embodiment of the present invention pose tracking apparatus operative to track the pose of a moving object based on magnetic flux measurements taken in the vicinity of the moving object, the pose tracking apparatus including a non-linear Kalman filter-based tracker operative to receive magnetic flux measurements performed in the vicinity of the moving object, to operate a non-linear Kalman-type filter on the measurements, thereby to generate information regarding the pose of the moving object, and a pose indicator operative to provide an output indication of the information regarding the pose of the moving object.

Further in accordance with a preferred embodiment of the present invention the non-linear tracker includes an EKF (extended Kalman filter).

Additionally in accordance with a preferred embodiment of the present invention, the non-linear filter operates on a state vector whose components include pose coordinates and first time-derivatives of the pose coordinates.

Further in accordance with a preferred embodiment of the present invention the pose coordinates include 3 spatial coordinates and 2 orientation coordinates.

Further in accordance with a preferred embodiment of the present invention the apparatus also includes a transmitter array, which may include less than six operative transmitters, inducing magnetic flux in the vicinity of the moving object.

Still further in accordance with a preferred embodiment of the present invention the non-linear tracker employs a Biot-Savart transformation from the pose of the moving object to the magnetic flux measurements taken in its vicinity.

Still further in accordance with a preferred embodiment of the present invention the step of employing the Biot-Savart transformation includes computing a function h of a state vector $\xi$, as follows:

$$h(\xi) = \frac{C_0}{R^3}\left(\frac{3A_1 A_2}{R^2} - A_3\right)$$

where $C_0$ is a coefficient,

R is the distance between a detector detecting the magnetic flux measurements and a transmitter within the transmitter array; and $A_1 = \delta x \sin(\theta_s)\cos(\phi_s) + \delta y \sin(\theta_s)\sin(\phi_s) + \delta z \cos(\theta_s)$ $A_2 = \delta x \sin(\theta_d)\cos(\phi_d) + \delta y \sin(\theta_d)\sin(\phi_d) + \delta z \cos(\theta_d)$ $A_3 = \sin(\theta_s)\cos(\phi_s)\sin(\theta_d)\cos(\phi_d) + \sin(\theta_s)\sin(\phi_s)\sin(\theta_d)\sin(\phi_d) + \cos(\phi_s)\cos(\phi_d)$ and wherein the pose of the detector is $(x_d, y_d, z_d, \theta_d, \phi_d)$ and the pose of the transmitter is $(x_s, y_s, z_s, \theta_s, \phi_s)$, and where $\delta x$, $\delta y$ and $\delta z$ denote the distance between the x, y and z components, respectively, of the detector's pose and the transmitter's pose.

Additionally in accordance with a preferred embodiment of the present invention the non-linear tracker approximates an elliptic integral, at least when the moving object is close to a transmitter within the transmitter array, by computing first and second terms of a Taylor series representing the elliptic integral.

Additionally in accordance with a preferred embodiment of the present invention, the approximated elliptic integral includes a correction to the above mentioned $A_1$ and $A_3$, $A_1 \rightarrow A_1(1-\delta)$ $A_3 \rightarrow A_3(1-\eta)$ $$\delta = \frac{5}{8}\left(\frac{\rho}{R}\right)^2\left(7\frac{A_1^2}{R^2} - 3\right)$$

$$\eta = \frac{9}{8}\left(\frac{\rho}{R}\right)^2\left(5\frac{A_1^2}{R^2} - 1\right)$$

and where $\rho$ is the radius of the transmitter.

Still further in accordance with a preferred embodiment of the present invention the orientation component of the pose of the moving object is represented by two angles, continuous over time $\theta'$ and $\phi'$, whose relationship with conventional polar coordinates $\theta$ and $\phi$ is as follows:

$$\theta = \begin{cases} \theta' & \text{if } \mod(\theta, 2\pi) \leq \pi \\ -\theta' & \text{if } \mod(\theta, 2\pi) > \pi \end{cases}$$

-continued $$\varphi = \begin{cases} \varphi' & \text{if } \theta = \theta' \\ \varphi' + \pi & \text{if } \theta = -\theta' \end{cases}$$

Still further in accordance with a preferred embodiment of the present invention, in order to avoid singularity, a dynamic offset is described by the following transformation:

$$\theta = \cos^{-1}[\cos(\theta')\cos(\phi')]$$

$$\phi = \cos^{-1}[\sqrt{\cos^2(\theta) + \sin^2(\phi')\cos^2(\theta')}]$$

where $\theta$ and $\phi$ include the orientation component of the moving object's pose after the dynamic offset, and $\theta'$ and $\phi$ include the orientation component of the moving object's pose before the dynamic offset.

Still further in accordance with a preferred embodiment of the present invention the non-linear filter employs the following matrices and operations:

$$\xi_k(-) = \Phi \xi_{k-1}(+)$$

where k is a time index, $\xi_k(-)$ is a state vector predictor, $\xi_k(+)$ is a state vector corrector, and $\Phi$ is a state transition matrix, $$P_k(-) = \Phi P_{k-1}(+) \chi^T + Q$$

where P(−) is an estimate error covariance matrix predictor, P(+) is an estimate error covariance matrix corrector and Q is a process noise covariance matrix, $$H_k = \left. \frac{\partial h(\vec{\xi})}{\partial \vec{\xi}} \right|_{\xi_k(-)}$$

where h is a sensitivity function and $\xi$ is a state vector, $$K_k = P_k(-)H_k^T[H_k P_k(-)H_k^T + R_k]^{-1}$$

where $R_k$ is a measurement noise covariance matrix, $$\xi_k(+) = \xi_k(-) + K_k\{\zeta_k - h[\xi_k(-)]\}$$

where $\zeta$ denotes the magnetic flux measurements taken in the vicinity of the moving object, and $$P_k(+) = [I - K_k H_k]P_k(-)$$

Still further in accordance with a preferred embodiment of the present invention the magnetic flux measurements may include less than six magnetic flux measurements in the vicinity of the moving object.

Additionally in accordance with a preferred embodiment of the present invention, the non-linear tracker is operative to time-vary a measurement-noise covariance matrix R and a process-noise covariance matrix Q.

Further in accordance with a preferred embodiment of the present invention the time-varying R and Q includes:

$$R_k^{dec} = R_{k-1}^{dec} e^{\frac{T_k - T_{k-1}}{\tau_{decay}}}$$

$$R_k = R_k^{dec} + R^{inf}$$

$$Q_k^{dec} = Q_{k-1}^{dec} e^{\frac{T_k - T_{k-1}}{\tau_{decay}}}$$

$$Q_k = Q_k^{dec} + Q^{inf}$$

Still further in accordance with a preferred embodiment of the present invention at least one of the transmitters inducing a magnetic flux sampled by the measurements is self-calibrated.

Additionally in accordance with a preferred embodiment of the present invention, the non-linear filter is operative to calibrate the location of each of the self-calibrating transmitters.

Further in accordance with a preferred embodiment of the present invention the non-linear filter is operative to calibrate the intensity of each of the self-calibrating transmitters.

Still further in accordance with a preferred embodiment of the present invention the non-linear filter is operative to calibrate the radius of each of the self-calibrating transmitters.

Additionally in accordance with a preferred embodiment of the present invention, the non-linear filter is operative to calibrate the orientation of each of the self-calibrating transmitters.

Further in accordance with a preferred embodiment of the present invention, the tracker uses a state vector whose components comprise characteristics of the self-calibrated transmitters inducing a magnetic flux sampled by the measurements, and wherein at least one of the characteristics is self-calibrated.

Still further in accordance with a preferred embodiment of the present invention, the non-linear tracker employs a measurement noise matrix R and a process noise covariance matrix Q at least one of which is generated by an adaptive process.

Additionally in accordance with a preferred embodiment of the present invention the adaptive process for Q comprises $$Q_k^{acc} = \alpha \left( \frac{\xi_k^{velocity}(+) - \xi_{k-1}^{velocity}(+)}{T_k - T_{k-1}} \right)^2 + (1-\alpha)Q_{k-1}^{acc}$$

$$Q_k = Q_k^{acc} + Q_o^{acc}$$

$$\xi_k^{velocity}(+) = \text{estimate of } \{\dot{x}, \dot{y}, \dot{z}, \dot{\phi}, \dot{\theta}\}$$

Further in accordance with a preferred embodiment of the present invention the adaptive process for R comprises $$R_k^{s,s} = \beta\{\zeta_k^s - h^s[\xi_k(-)]\}^2 + (1-\beta)R_{k-1}^{s,s}$$

$$R_k = R_k^{s,s} + R_o^{s,s}$$

BRIEF DESCRIPTION OF THE DRAWINGS AND APPENDIX

The present invention will be understood and appreciated from the following detailed description, taken in conjunction with the drawings and appendix in which:

FIGS. 1A–1C, taken together, form a simplified flow chart illustration of a preferred method of operation of a Biot-Savart based EKF-type tracking filter;

Appendix A is a copy of copending Israel Patent Application No. 126284.

DETAILED DESCRIPTION OF PREFERRED EMBODIMENTS

Definition of terms:

Pose: five dimensional coordinates of a circular-symmetrical object, including three coordinates describing its location in a three-dimensional space, and two coordinates describing its orientation.

Orientation: two-dimensional angular position of an object, describing its orientation relative to a fixed orientation in three-dimensional space.

Transmitter: a device operative to emit a magnetic field from which a magnetic flux may be created.

Detector: a device operative to transform the magnetic flux that crosses its area into electric voltage.

Figure 1A:
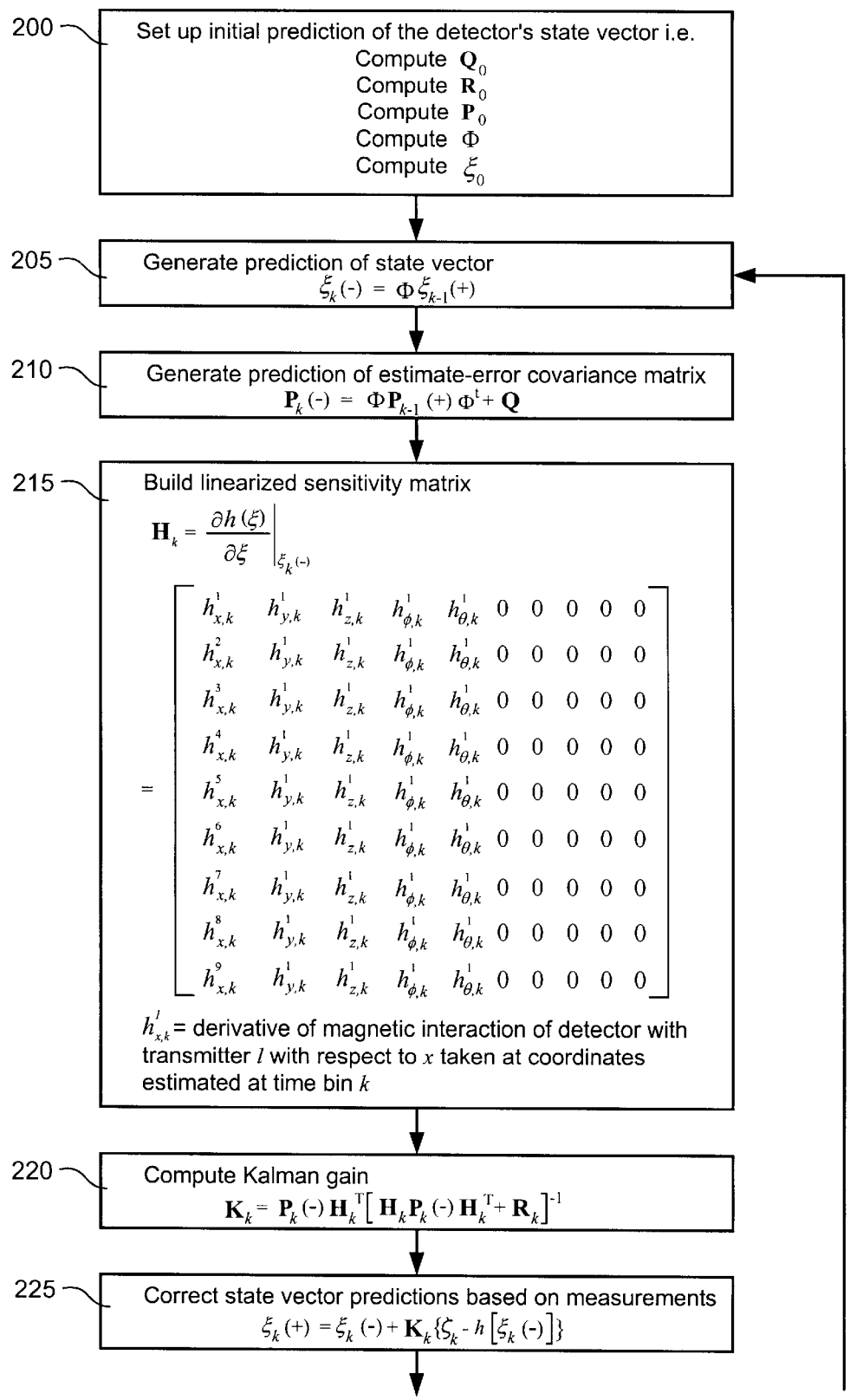
Figure 1B:
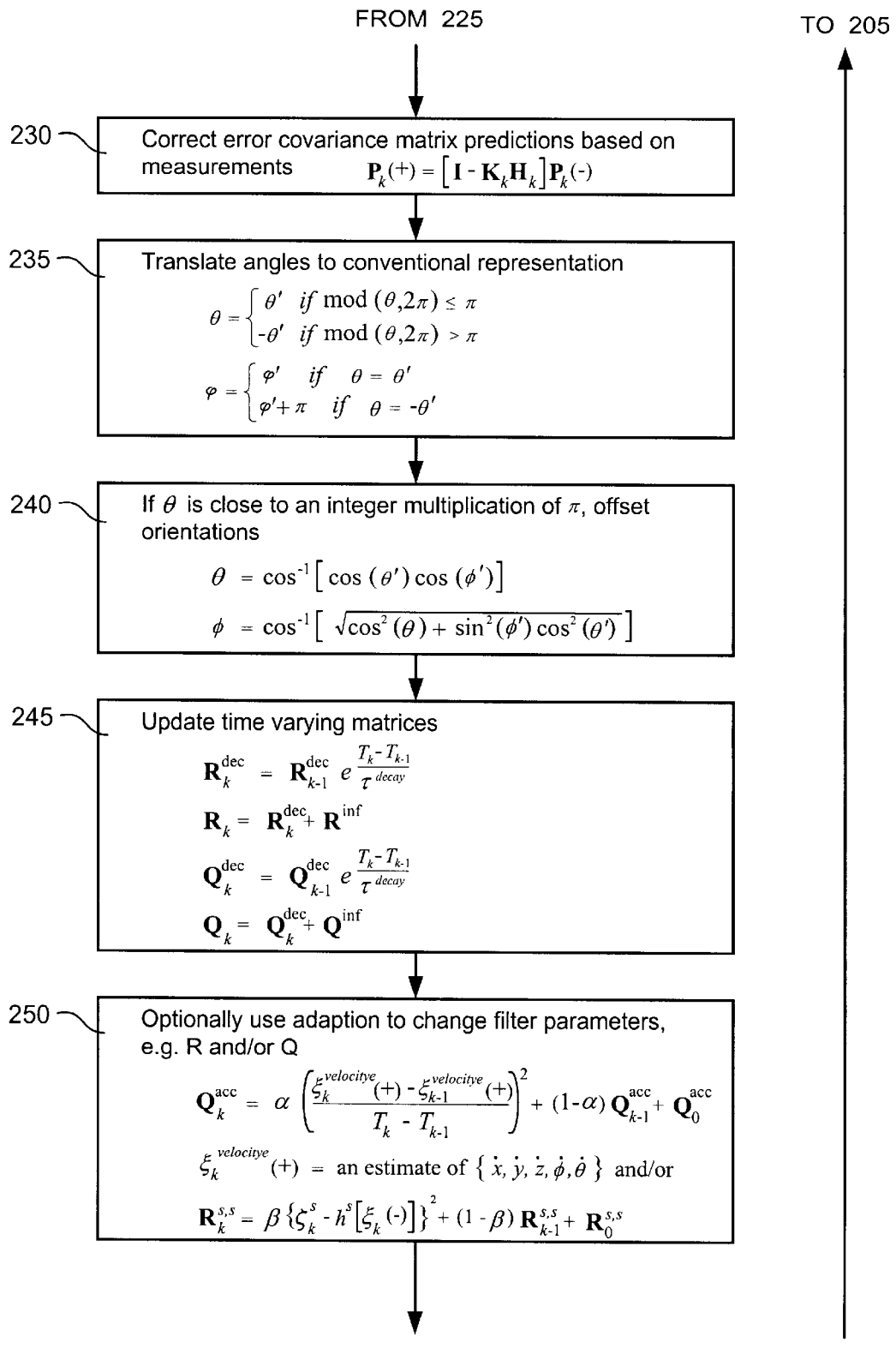
Figure 1C:
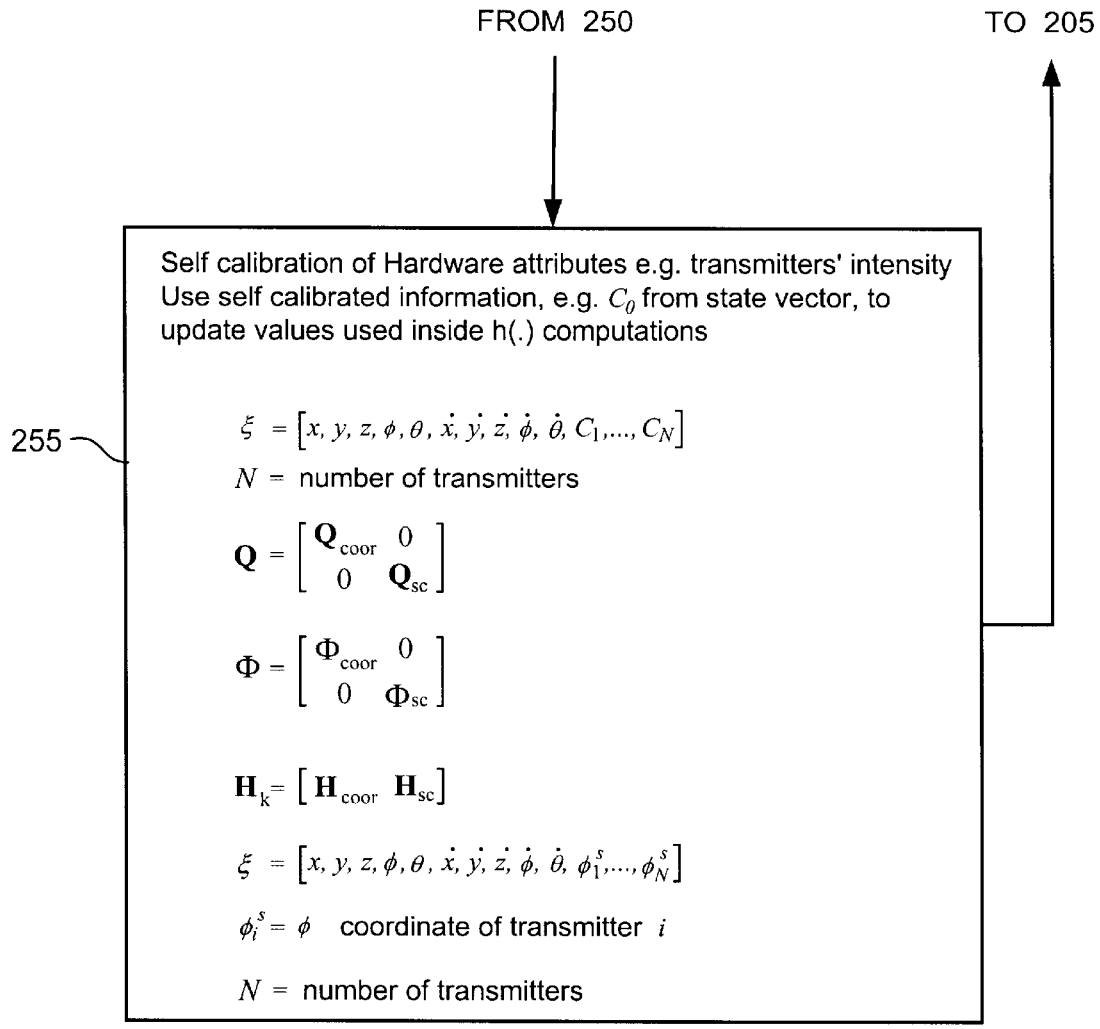

FIGS. 1A–1C, taken together, form a flow chart diagram of a preferred method of operation of a Biot-Savart based EKF-type tracking filter.

Figure 2:
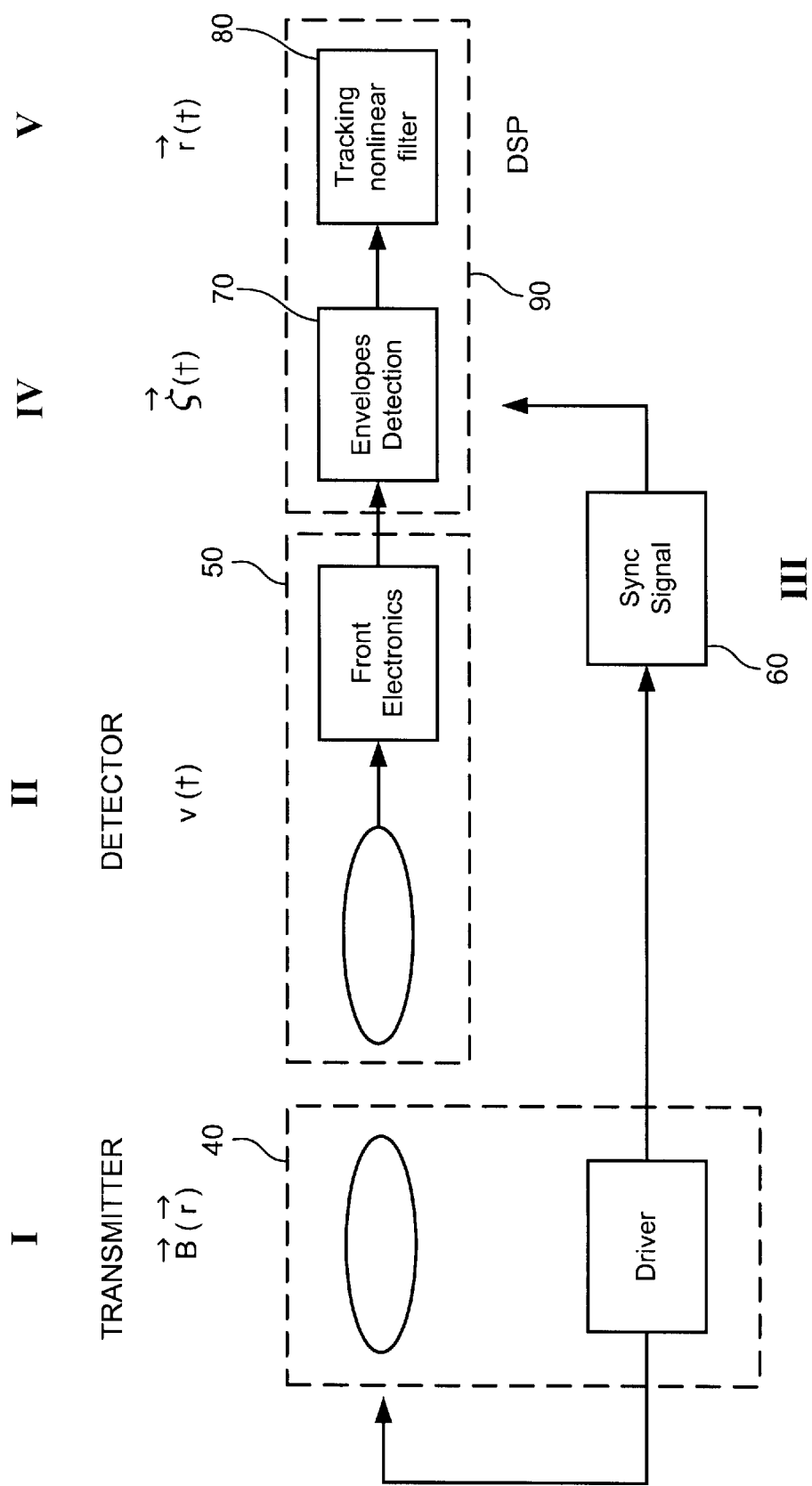
FIG. 2 is a simplified block diagram of an example of a tracking system, including a Biot-Savart based EKF-type tracking filter operating in accordance with the method of FIGS. 1A–1C.

FIG. 2 is a simplified block diagram of an example of a tracking system, including a Biot-Savart based EKF-type tracking filter, operating in accordance with the method of FIGS. 1A–1C. As shown, the system of FIG. 2 preferably comprises the following functional units:

1. a transmission system (transmitter) 40, including a number of electric coils and the electronic circuits that drive them (i.e. driver);
2. a detection system (detector) 50, including a coil and the electronic circuit that provides preprocessing, e.g., pre-amplification, gain control, and filtering;
3. a synchronization system 60;
4. an envelopes-detector 70; and
5. a tracking non-linear filter (tracker) 80.

Each of transmitters 40 may comprise a conventional solenoid, driven by an A/C current.

Detector 50 may be similar to units termed "One axis magnetic field detector 50" and "Signal Conditioning and A/D Conversion 64" of FIG. 1D of copending Israel Patent Application No. 126284, the text of which is appended hereto as Appendix A.

Figure 6A:
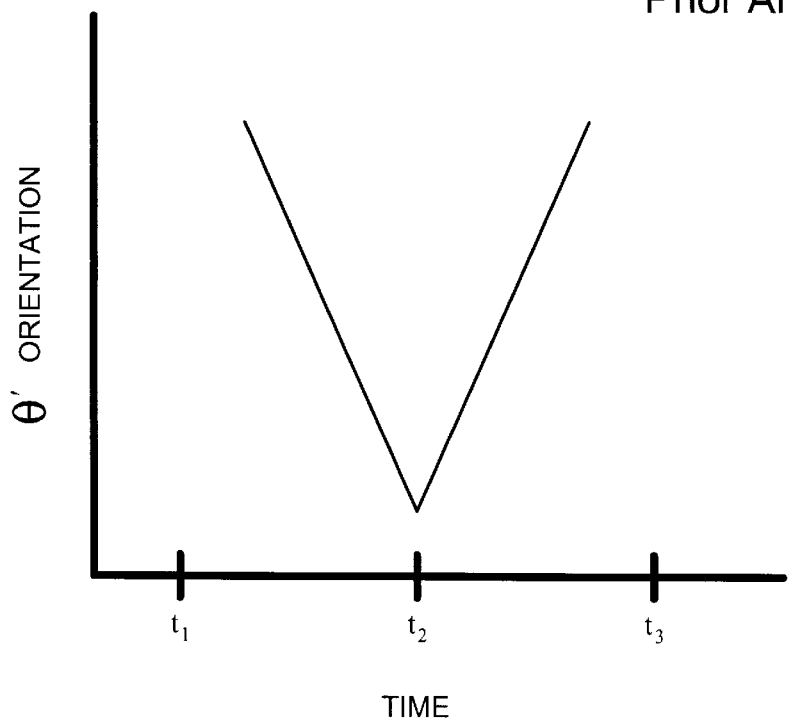
FIGS. 6A and 6B are simplified diagrams of the dynamics of the coordinates for the conventional polar orientation of FIG. 5.

Synchronization system 60 may be similar to a unit termed "System Synchronization 420" of FIG. 6A of copending Israel Patent Application No. 126284, the text of which is appended hereto as Appendix A.

Figure 3:
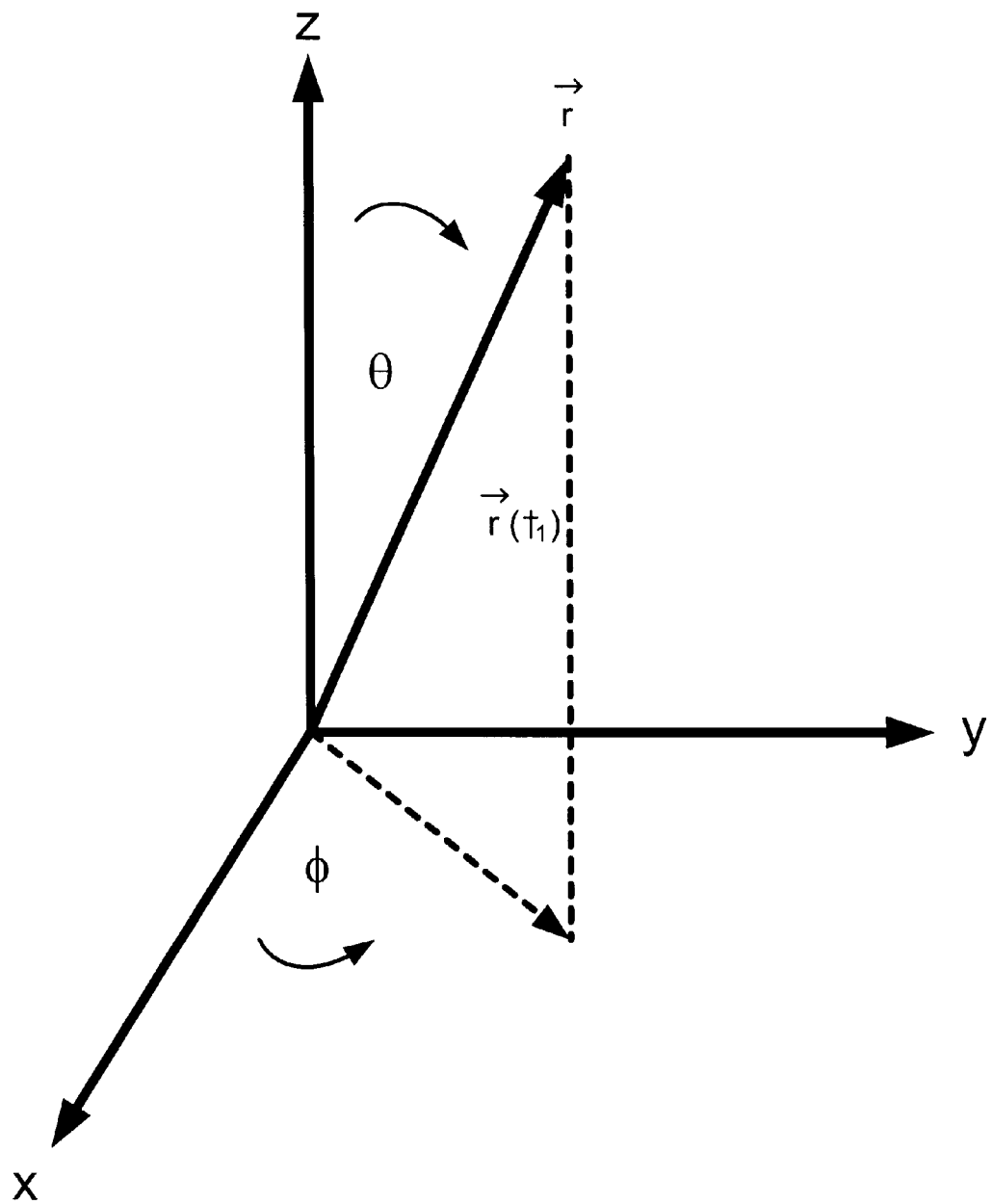
FIG. 3 is a vector diagram illustrating state vector orientations.

Envelopes-detector 70 may be similar to a unit termed "Envelope Detector for determination of amplitudes $C^1, \ldots C^N$ ($N \geq 6$) 114" of FIG. 3 of copending Israel Patent Application No. 126284, the text of which is appended hereto as Appendix A.

Tracking non-linear filter 80 may be similar to a unit termed "Position finding 116" of FIG. 3 of copending Israel Patent Application No. 126284, the text of which is appended hereto as Appendix A.

A preferred method of operation for a Biot-Savart based EKF-type tracking nonlinear filter 80 is described herein in detail with reference to FIGS. 1A–1C. By way of example, a transmitter-array inducing magnetic fields is described. The superposition of these magnetic fluxes is described as being detected by a magnetic flux detector, and resolved to individual fluxes by an envelope detector. However, it is appreciated that this invention may employ other forms of flux induction and flux measurements.

State Space Model of a Dynamic System

A conventional Kalman filter (KF) is a sequential tracker that generates an optimal estimate of the state of a linear system based on measures of the noise in the system, a model of the system's equations of motion and an estimate of its previous state. If the system of interest is not linear then an "EKF" (Extended Kalman Filter), one out of many variations of a KF, is typically used.

A conventional KF uses several matrices to compute an optimal estimate to a state vector. These matrices are derived from the system equations of motion, e.g. as follows:

An approximation to the system dynamics is made:

$$\dot{\xi}(t) = F\xi(t) + w(t)$$
$$\zeta(t) = h[\xi(t)] + v(t) \quad (1)$$

In equation (1) $\xi(t)$ is a state vector, F is the differential equation coefficient matrix, w(t) is a system noise, $\zeta(t)$ is the measurements, h(•) is the measurement sensitivity function, and v(t) is the measurement noise. h(•) is a vector function whose dimension is the number of measurements. The measurements $\zeta$ may be the same as the "C's" i.e. the output from the Envelope Detector 114 and the input of the Position Detector 116, of FIG. 5 of copending Israel Patent Application No. 126284, the text of which is appended hereto as Appendix A. Both measurement-noise and system-noise are assumed invariant white Gaussian distributed processes, and are independent of each other.

The discrete time form of equation (1) reads:

$$\xi_k = \Phi \xi_{k-1} + w_{k-1}$$
$$\zeta_k = h[\zeta_k] + v_{k-1} \quad (2)$$

$\xi_k$ is the state vector at time-step k, $\Phi$ is the state transition matrix, $w_k$ is the system noise, h(•) is the measurement sensitivity function, $\zeta_k$ is the measurements vector, and $v_k$ is the measurement noise, all at time bin k. The noises $w_k$ and $v_k$ are independent invariant Gaussian processes.

Any choice of state vector is typically accepted providing it includes enough information to compute the desired pose. One possible choice is:

$$\xi = [x, y, z, \phi, \theta, \dot{x}, \dot{y}, \dot{z}, \dot{\phi}, \dot{\theta}] \quad (3)$$

where $\{x, y, z, \phi, \theta\}$ are the five coordinates of the detector's pose as illustrated in FIG. 3, and a dot over a variable denotes the variable's time-derivative. The effect of higher-order derivatives is implicitly included within the system noise.

The KF is based on some knowledge of the statistics of Gaussian noises $w_k$ and $v_k$:

$$E<v_k v_i^T> = \delta_{k,i} R_k$$
$$E<w_k w_i^T> = \delta_{k,i} Q_k$$
$$E<w_k> = E<v_k> = 0 \quad (4)$$

where $\delta_{k,i}$ denotes the Kronecker delta function.

The transition from continuous to discrete time is made using the relation:

$$\Phi = e^{FT} = e^{F(t_k - t_{k-1})}$$

$$E<v_k v_i^T> = \delta_{k,i} R \quad E<v(t)v(s)> = \delta(t-s)\tilde{R}$$

$$E<w_k w_i^T> = \delta_{k,i} Q \quad E<w(t)w(s)> = \delta(t-s)\tilde{Q} \qquad (5)$$

$$R = \frac{\tilde{R}}{(t_k - t_{k-1})} \quad Q = \tilde{Q}(t_k - t_{k-1})$$

The last two expressions of equation (5) are only approximations. The former neglects non-linear terms of $(t_k - t_{k-1})$, and the latter is correct if the sensor integrates the noise over the period between $t_{k-1}$ and $t_k$.

Using an Extended Kalman Filter for Magnetic Tracking

The measurement sensitivity function h(•), which relates the induced voltage to the magnetic field, is known as the Biot-Savart law and is difficult to express in a closed form. Thus, an approximation is preferably made, such as:

$$h(\xi) = \frac{C_0}{|\vec{r}|^3} \left[ \frac{3}{|\vec{r}|^2} (\vec{n}_s \cdot \vec{r})(\vec{n}_d \cdot \vec{r}) - (\vec{n}_s \cdot \vec{n}_d) \right] \qquad (6)$$

$$\vec{r} = \vec{r}_s - \vec{r}_d$$

Figure 4:
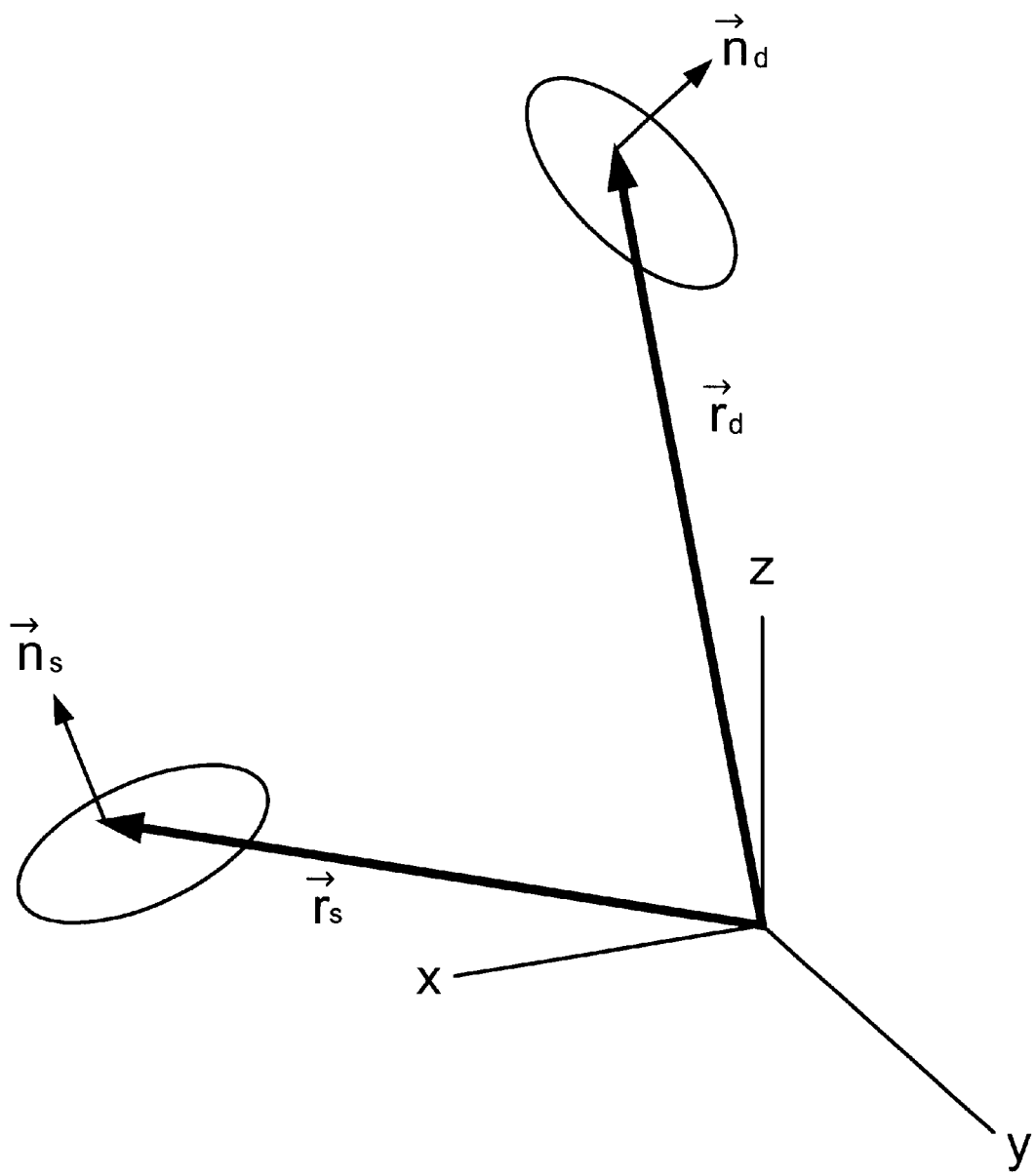
FIG. 4 is a vector diagram illustrating the Biot-Savart law.

$r_s$ and $r_d$ are the position vector of the transmitter and the detector, and $n_s$ and $n_d$ are their corresponding plane unit vectors (the plane vector is a vector whose orientation is perpendicular to the plane). These notations are depicted in FIG. 4. The function $h(\xi)$ is a vector flnction. Each of its members corresponds to the interaction with a single transmitter. For each member of the vector flnction, the values of $r_s$, $n_s$, and $C_0$ take corresponding values.

Operation of the tracker 80 can be defined using any of several extensions to the Kalman filter. A preferred embodiment of the present invention utilizing an EKF is described hereinbelow, and is illustrated in FIGS. 1A–1C.

The procedure is an iterative one, providing successive estimates each based on the previous one. An initial computation 200 typically provides five initial arrays: $Q_0$, $R_0$, $P_0$, $\Phi$, and $\xi_o$. The role of each is described below.

Given an estimate to the state vector at time step k−1, a prediction 205 is made to the state vector at time k:

$$\xi_k(-) = \Phi \xi_{k-1}(+) \qquad (7)$$

The notation (−) and (+) denote an estimation made prior to measurement taking (prediction) and after it (correction) respectively. For the state vector suggested in equation (3), the matrix $\Phi$ takes the form:

$$\Phi = \begin{bmatrix} 1 & 0 & 0 & 0 & 0 & T_s & 0 & 0 & 0 & 0 \\ 0 & 1 & 0 & 0 & 0 & 0 & T_s & 0 & 0 & 0 \\ 0 & 0 & 1 & 0 & 0 & 0 & 0 & T_s & 0 & 0 \\ 0 & 0 & 0 & 1 & 0 & 0 & 0 & 0 & T_s & 0 \\ 0 & 0 & 0 & 0 & 1 & 0 & 0 & 0 & 0 & T_s \\ 0 & 0 & 0 & 0 & 0 & 1 & 0 & 0 & 0 & 0 \\ 0 & 0 & 0 & 0 & 0 & 0 & 1 & 0 & 0 & 0 \\ 0 & 0 & 0 & 0 & 0 & 0 & 0 & 1 & 0 & 0 \\ 0 & 0 & 0 & 0 & 0 & 0 & 0 & 0 & 1 & 0 \\ 0 & 0 & 0 & 0 & 0 & 0 & 0 & 0 & 0 & 1 \end{bmatrix} \qquad (8)$$

A prediction 210 is made to the estimate error covariance-matrix:

$$P_k(-) = \Phi P_{k-1}(+)\Phi^T + Q \qquad (9)$$

The matrix Q in this example takes the form:

$$Q = \begin{bmatrix} 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & Q_x & 0 & 0 & 0 & 0 \\ 0 & 0 & 0 & 0 & 0 & 0 & Q_y & 0 & 0 & 0 \\ 0 & 0 & 0 & 0 & 0 & 0 & 0 & Q_z & 0 & 0 \\ 0 & 0 & 0 & 0 & 0 & 0 & 0 & 0 & Q_\phi & 0 \\ 0 & 0 & 0 & 0 & 0 & 0 & 0 & 0 & 0 & Q_\theta \end{bmatrix}$$

$$Q_x = (T_s \times \text{maximalallowed} \ddot{x})^2$$

$$Q_y = (T_s \times \text{maximalallowed} \ddot{y})^2$$

$$Q_z = (T_s \times \text{maximalallowed} \ddot{z})^2$$

$$Q_\phi = (T_s \times \text{maximalallowed} \ddot{\phi})^2$$

$$Q_\theta = (T_s \times \text{maximalallowed} \ddot{\theta})^2 \qquad (10)$$

A linear approximation 215 is Diade to the measurement sensitivity finction. For the state vector suggested in equation (3), and as to an example of a 9-transmitter system, this approximation becomes:

$$H_k = \left. \frac{\partial h(\xi)}{\partial \xi} \right|_{\xi_k(-)} \qquad (11)$$

$$= \begin{bmatrix} h^1_{x,k} & h^1_{y,k} & h^1_{z,k} & h^1_{\phi,k} & h^1_{\theta,k} & 0 & 0 & 0 & 0 & 0 \\ h^2_{x,k} & h^1_{y,k} & h^1_{z,k} & h^1_{\phi,k} & h^1_{\theta,k} & 0 & 0 & 0 & 0 & 0 \\ h^3_{x,k} & h^1_{y,k} & h^1_{z,k} & h^1_{\phi,k} & h^1_{\theta,k} & 0 & 0 & 0 & 0 & 0 \\ h^4_{x,k} & h^1_{y,k} & h^1_{z,k} & h^1_{\phi,k} & h^1_{\theta,k} & 0 & 0 & 0 & 0 & 0 \\ h^5_{x,k} & h^1_{y,k} & h^1_{z,k} & h^1_{\phi,k} & h^1_{\theta,k} & 0 & 0 & 0 & 0 & 0 \\ h^6_{x,k} & h^1_{y,k} & h^1_{z,k} & h^1_{\phi,k} & h^1_{\theta,k} & 0 & 0 & 0 & 0 & 0 \\ h^7_{x,k} & h^1_{y,k} & h^1_{z,k} & h^1_{\phi,k} & h^1_{\theta,k} & 0 & 0 & 0 & 0 & 0 \\ h^8_{x,k} & h^1_{y,k} & h^1_{z,k} & h^1_{\phi,k} & h^1_{\theta,k} & 0 & 0 & 0 & 0 & 0 \\ h^9_{x,k} & h^1_{y,k} & h^1_{z,k} & h^1_{\phi,k} & h^1_{\theta,k} & 0 & 0 & 0 & 0 & 0 \end{bmatrix}$$

where the term $h^1_{x,k}$ denotes the dlerivative of magnetic interaction of the detector with transmitter number 1 with respect to x taken at the coordinates estimated at time bin k. Similarly, other terms denote (deriTvatives of other interactions with respect to other coordinates. The right half is zero because the contribution of the speed to the magnetic interaction is neglected ,and therefore, the derivative with respect to speed vanishes. It is appreciate the incorporation of the contribution of the speed into the magnetic interaction, if desired, is straightforward.

The following approximation miay be used to compute the Kalman gain matrix 220:

$$K_k = P_k(-) H_k^T [H_k P_k(-) H_k^T + R_k]^{-1} \qquad (12)$$

For the example of a 9-transmitter system, R may take the form:

$$R = \begin{bmatrix} R^1 & 0 & 0 & 0 & 0 & 0 & 0 & 0 & 0 \\ 0 & R^2 & 0 & 0 & 0 & 0 & 0 & 0 & 0 \\ 0 & 0 & R^3 & 0 & 0 & 0 & 0 & 0 & 0 \\ 0 & 0 & 0 & R^4 & 0 & 0 & 0 & 0 & 0 \\ 0 & 0 & 0 & 0 & R^5 & 0 & 0 & 0 & 0 \\ 0 & 0 & 0 & 0 & 0 & R^6 & 0 & 0 & 0 \\ 0 & 0 & 0 & 0 & 0 & 0 & R^7 & 0 & 0 \\ 0 & 0 & 0 & 0 & 0 & 0 & 0 & R^8 & 0 \\ 0 & 0 & 0 & 0 & 0 & 0 & 0 & 0 & R^9 \end{bmatrix} \quad (13)$$

where $R^s$ denotes the covariance of the measurement error for transmitter s, and the measurement errors of different transmitters are assumed to be uncorrelated.

The gain 220, in turn, may be used to make a correction 225 to the predicted state vector 205 and a correction 230 to the predicted error covariance matrix 210. The correction to the stae vector 225 may be a multiplication of the gain by the difference between the measurements and the predicted measurements based on the state vector (the innovations):

$$\xi_k(+) = \xi_k(-) + K_k\{\zeta_k - h[\zeta_k(-)]\} \quad (14)$$

The correction to the error covariance matrix 230 contains the gain 220 and the rement sensitivity function 215:

$$P_k(+) = [I - K_k H_k] P_k(-) \quad (15)$$

Thus, by providing initial approximations 200 to the state vector, the error covariance matrix, $P_o$, and a model in terms of Q, R and h(•) a sequence of optimal estimates based on measurements $\zeta_k$ can be produced.

The exact values of initial arrays 200 are not critical. The values of the matrices Q and R may be estimated from prior knowledge of the system, i.e., the elements of R are computed from the measurement noise and the value of Q from the expected accelerations in the system. $P_0$ may take any representative value, e.g., if a speed of five meters per second is expected, then the elements of $P_0$ relating to speed would take the value of twenty-five meters per second. Similarly, $\zeta_0$ may take the values of a typical state, e.g., if tracking is limited to a one-meter cube, and speed is limited to one meter per second, then $\zeta_0$ may become a vector of ones.

The approximation to the Biot-Savart law given in equation (6) may not be convenient for computation. In order to facilitate computation, it may be presented in terms of the pose of the detector 50 $\{x_d, y_d, z_d, \phi_d, \theta_d\}$ and the pose of the transmitter 40 $\{x_s, z_s, z_s, \phi_s, \theta_s\}$. The translations and distance are computed:

$$\delta x = x_s - x_d$$

$$\delta y = y_s - y_d$$

$$\delta z = z_s - z_d$$

$$R = \sqrt{\delta x^2 + \delta y^2 + \delta z^2} \quad (16)$$

These values are used to compute three temporary values:

$$A_1 = \delta x \sin(\theta_s)\cos(\phi_s) + \delta y \sin(\theta_s)\sin(\phi_s) + 460 \, \delta z \cos(\theta_s)$$

$$A_2 = \delta x \sin(\theta_d)\cos(\phi_d) + \delta y \sin(\theta_d)\sin(\phi_d) + \delta z \cos(\theta_d)$$

$$A_3 = \sin(\theta_s)\cos(\phi_s)\sin(\theta_d)\cos(\phi_d) + \sin(\theta_s)\sin(\phi_s)\sin(\theta_d)\sin(\phi_d) + \cos(\phi_s)\cos(\phi_d) \quad (17)$$

The magnetic interaction is computed:

$$h(\xi) = \frac{C_0}{R^3}\left(\frac{3A_1 A_2}{R^2} - A_3\right) \quad (18)$$

where $C_0$ is a coefficient that is preferably experimentally determined. Knowing the pose of the detector 50 and the pose of the transmitter 40, once $C_0$ is known, the magnetic interaction can be computed.

Improved Biot-Savart Approximation

Equations (16), (17) and (18) are more convenient to use when the state vector (3) is known, though it is sometimes still a poor approximation. Better tracking is achieved when the model of magnetic interaction is improved, considering more physical effects. For example, a simple approximation assumes that the radius of the transmitter's coil is much smaller than the distance between the transmitter and the detector. In this preferred embodiment of the present invention, a large transmitter is preferred because it allows easier induction of intense magnetic fields. Thus, when the detector nears the transmitter a correction is made to $A_1$ and $A_3$:

$$A_1 \rightarrow A_1(1-\delta)$$

$$A_3 \rightarrow A_3(1-\eta)$$

$$\delta = \frac{5}{8}\left(\frac{\rho}{R}\right)^2\left(7\frac{A_1^2}{R^2} - 3\right) \quad (19)$$

$$\eta = \frac{9}{8}\left(\frac{\rho}{R}\right)^2\left(5\frac{A_1^2}{R^2} - 1\right)$$

where ρ is the radius of the transmitter's coil, and R is defined by equation (16). Equations (18) and (19) are both approximations to the Biot-Savart law. The former approaches the exact solution when both the transmitter and the detector have an infinitely small radius. When the transmitter's radius increases, an exact solution to the Biot-Savart law may be expressed in terms of elliptic integrals. Equation (19) approximates the exact solution when only the first and second terms of a Taylor series in ρ/R are taken.

Using Redundant Measurements to Improve Tracking

The number of measurements necessary to provide precise tracking is an important practical issue. It is desirable to produce a system with a minimal number of transmitters to reduce the hardware production cost and to decrease the computational load. The reduction in computational load is because the heaviest computation in the whole process is the computation of the inverse operation in equation (12) of step 220, and the order of the inverted matrix equals the number of transmitters.

The tracking system does not require five measurements to work although there are five unknown variable coordinates. The tracking system makes optimal use not only of the current measurements but also of all past measurements. The smaller the number of the measurements the poorer the tracking. However, since only minimal error estimation is produced, it is possible to get reasonable tracking when the perfect solution is not available.

To provide a tracking as precise as possible, increasing the number of measurements is desirable. In practice, a situation may arise when the knowledge about the parameters of one or more transmitters deteriorates, e.g. the pose of a transmitter may change as a result of a mechanical shock, or its intensity may change as a result of electronics imperfection or temperature change. With a multiple-measurements system, the Kalman filter would seek to provide an output that minimizes the errors, and a defective transmitter contributes some error. The larger the number of transmitters the smaller the weight of each in the error minimization, and the more precise the estimate. Thus, increasing the number of transmitters improves the tracking performance.

It is a clear advantage of a preferred embodiment of the present invention that any number of transmitters may be easily incorporated into the system. Typically, this increase only requires a software change, preferably implemented at the detector's DSP 90.

Selecting Vector-state Optimized for Tracking Problem

The state vector of equation (3) contains two orientation coordinates, $\phi$ and $\theta$. The meaning of each is depicted in FIG. 3. A common choice for these coordinates is polar representation wherein the angle $\theta$ denotes the angle between the z-axis and the orientation vector, and the angle $\phi$ is the angle between the x-axis and the projection of the orientation vector on the x–y plane. $\theta$ ranges from zero to $\pi$ radians, and $\phi$ ranges from zero to $2\pi$ radians.

Figure 5:
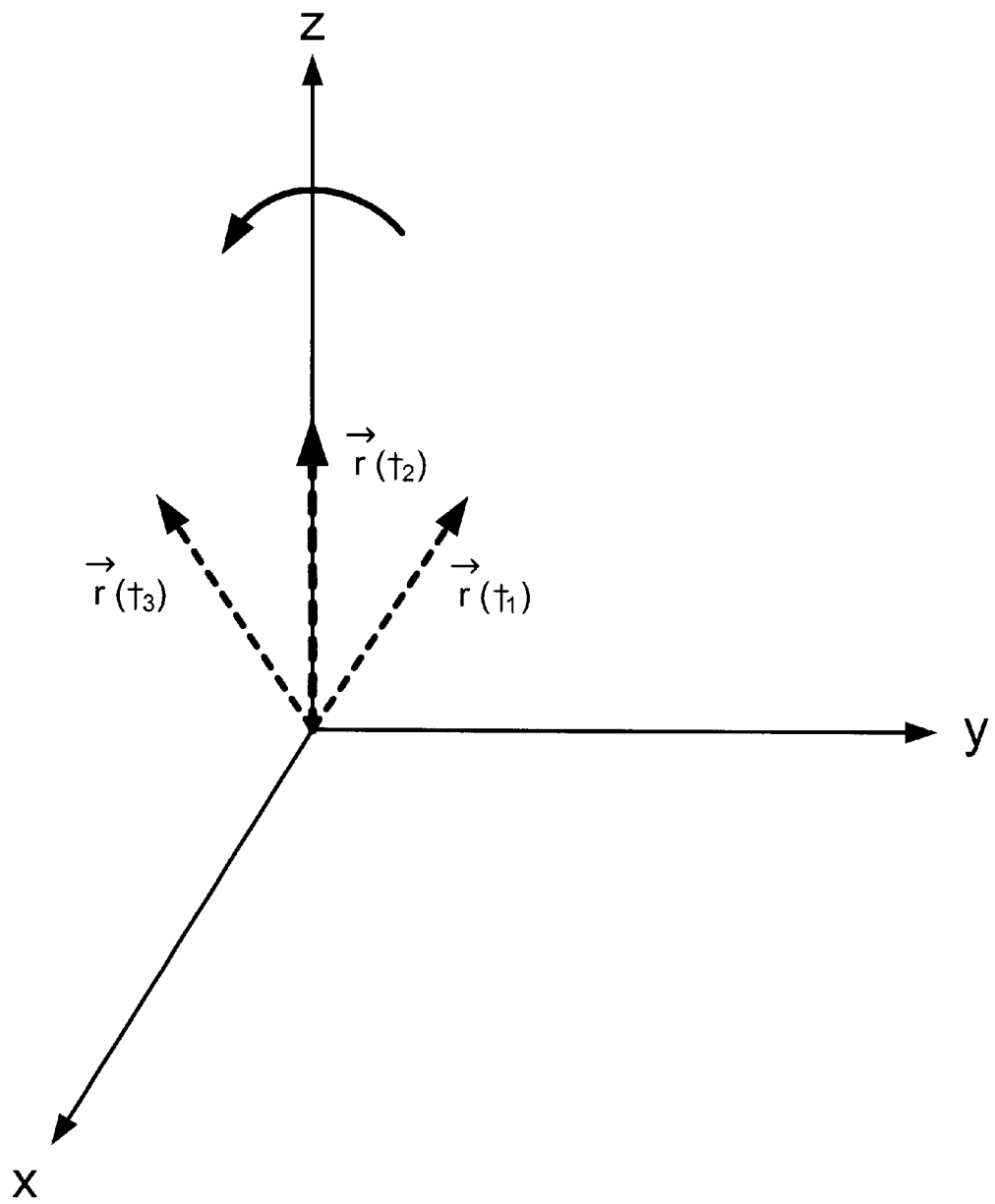
FIG. 5 is a simplified diagram of a detector crossing a singularity point.
Figure 6B:
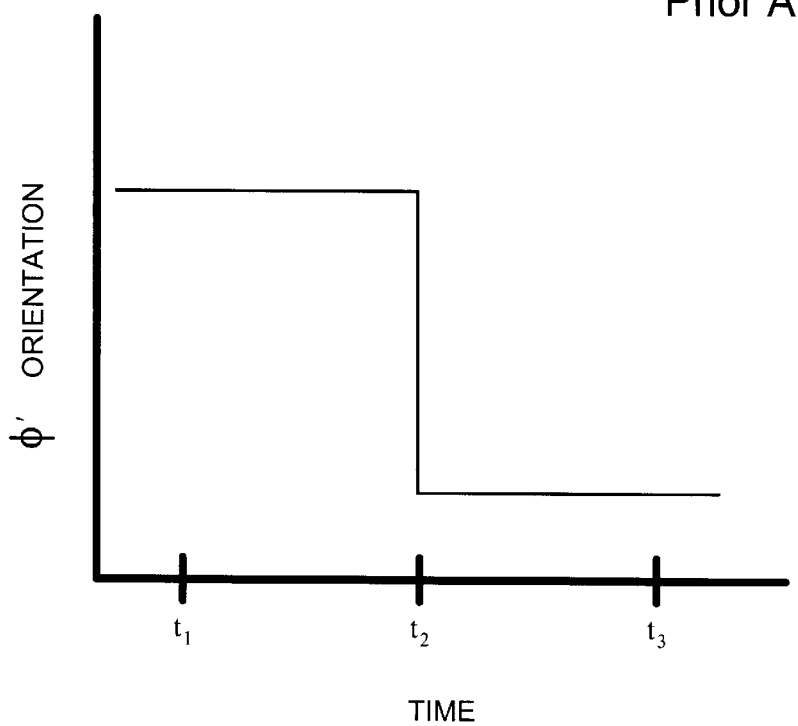

This representation, common in the prior art, is a problematic one. FIG. 5 shows an orientation vector gradually approaching the orientation of the z-axis, whose $\theta$ coordinate is decreasing with constant (negative) velocity while the $\phi$ coordinate is constant. As the orientation vector crosses the $\theta$ equals zero point, this coordinate starts increasing again. The speed thus instantly changes its signll resulting in a velocity discontinuity. Furthermore, regarding the $\phi$ coordinate, as the orientation vector crosses the $\theta$ equals zero point its projection on x-y plane suddenly moves to the opposite quadrant resulting in an instant sign change. Thus, not only the velocity, but the coordinate itself is discontinuous. The conventional (prior art) dynamics of these coordinates are illustrated in FIG. 6.

In the preferred embodiment of the present invention, a different orientation coordinate system is used. This system $\{\phi', \theta'\}$ is best described by its mapping 235 into the conventional polar coordinate system $\{\phi, \theta\}$:

$$\theta = \begin{cases} \theta' & \text{if } \mod(\theta, 2\pi) \leq \pi \\ -\theta' & \text{if } \mod(\theta, 2\pi) > \pi \end{cases} \quad (20)$$

$$\varphi = \begin{cases} \varphi' & \text{if } \theta = \theta' \\ \varphi' + \pi & \text{if } \theta = -\theta' \end{cases}$$

Using this coordinate system, the removal of the discontinuities associated with the movement described in FIG. 5, may be verified. The orientation vector approaches the $\theta'=0$ point with negative velocity, its $\theta'$ coordinate becomes negative, and the $\phi'$ coordinate, having zero velocity keeps its value. However, when translated into the conventional representation then $\theta=-\theta'$, and $\phi=\phi'+\pi$.

Figure 7A:
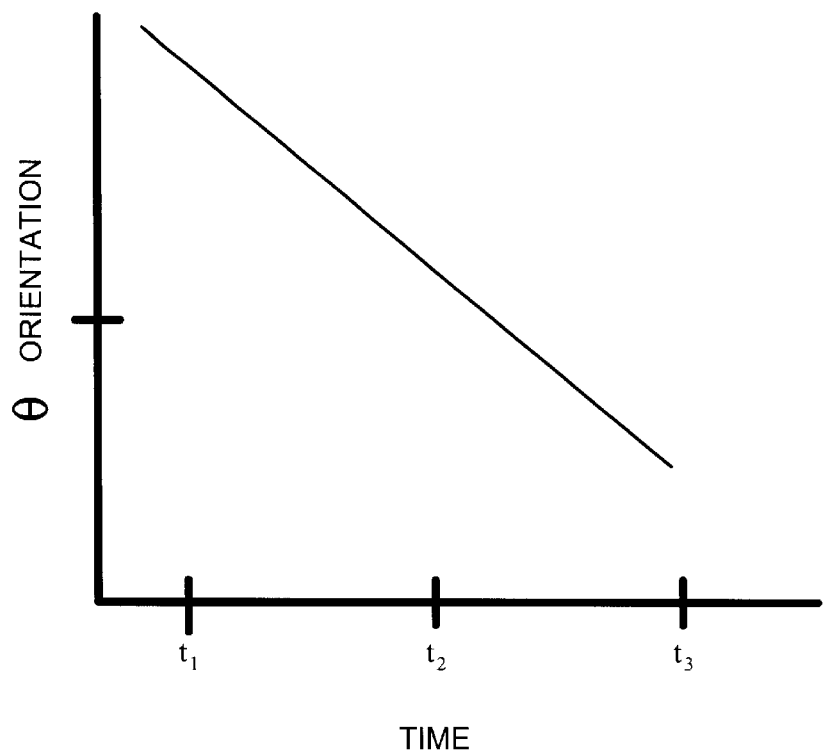
FIGS. 7A and 7B are simplified diagrams of the dynamics of the coordinates for the polar orientation of FIG. 5 in accordance with a preferred embodiment of the present invention.
Figure 7B:
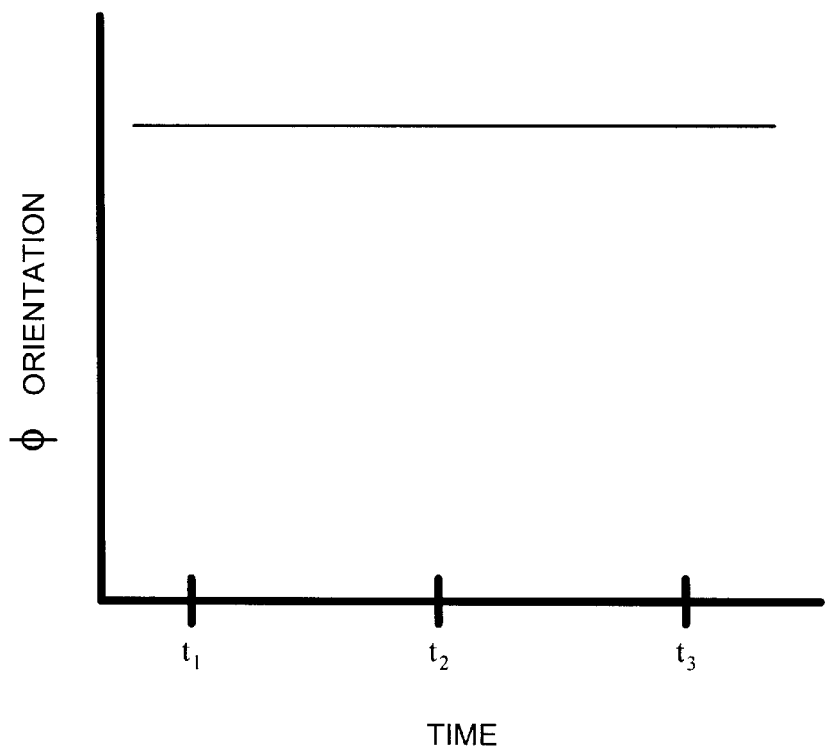

The dynamics of this representation are illustrated in FIG. 7. In this preferred embodiment of the invention, both components of the orientation vector may take any value, negative or positive, and both the coordinates and their velocities are always continuous.

Neither the conventional representation, nor the representation of the preferred embodiment of the present invention shown and described hereinabove, removes the ambiguity of the $\phi$ coordinate when $\theta$ equals zero. This singularity may express itself as a tracking discontinuity if the detector pauses at $\theta=0$, develops a $\phi$ value that has no physical consequences, and starts movi ng again.

A dynamic offset 240 of the coordinate system solves this problem by rotating the axes of the polar orientation representation when the detector's orientation approaches the singularity. This transformation is equ ivalent to a rotation of the coordinate system such that the z-axis points at a different direction, e.g. the x and z coordinates may typically be switched. The transformation to the new system in this particular example is:

$$\theta = \cos^{-1}[\cos(\theta')\cos(\phi')]$$

$$\phi = \cos^{-1}[\sqrt{\cos^2(\theta) + \sin^2(\phi')\cos^2(\theta')}] \quad (21)$$

This transformation may be applied every time the detector's $\theta$ becomes smaller than, e.g., 10 degrees. Of course, keeping track of the size of $\theta$ and applying the transformation (18) constitutes a computational burden that may be avoided when transformation (17) is employed, and therefore, is only used when the mathematical ambiguity manifests itself in the implementation.

Pose Acquisition Using Time Varying Filter

The filter described in equations (7) through (15) assumes a good initial estimate of the state vector is available, and further tracking proceeds through the prediction-correction iteration. If an initial estimate is not available, the filter may diverge. The divergence problem becomes more serious for non-linear applications since the initial state estimate may fall at a local minimum of the error function in phase space. Thus the detector-positioning problem comprises two probably separate problems: acquisition and tracking.

The exact pose of the detector 50 is never perfectly known. Thus, one would think that any initial estimate, even a poor one, would serve to initiate the process. However, the consistency of the equations preferably should be preserved lest the filter diverge.

The filter performs two interwoven operations: tracking the state vector and solving the Ricatti difference equation, i.e., numerically solving the difference equation for P. The Ricatti equation may be updated using equations (9) and (15), and the solution has only a weak feedback through its dependency on the estimate of the state-vector. Thus, it proceeds at its own pace with little reg,ard to the accuracy of the results. The state vector estimate, on the other hand, makes use of the P matrix, assuming it is correct. If the initial guess is very poor, the Ricatti equation may converge and a small P emerges while the error is still very large. The filter would assume the error is small, and the process very stable, and a large gain may result. Tlie large gain combined with large innovations may cause filter divergence.

To allow the filter to start with a poor initial guess, the Ricatti equation convergence is preferably slowed down, either by artificially keeping a large R, or a large Q. Large R results in a long integration time due to its location inside the inverse operation at the gain formula. Large Q keeps the steady-state solution large because Q is always added to the prediction.

As the filter proceeds, acquires more measurements, and produces better estimates, the large covariance matrices become an obstacle. Once a precise estimate is available, a small R is preferred, allowing an even tighter estimate and thus fuilly exploiting the measurements. The filter preferably requires a mechanism allowing switching from an acquisition mode, in which convergence is dominant to a tracking mode, in which convergence is ensured, and precision becomes more important. The switch is preferably smooth, as sudden changes in filter parameters may also be catastrophic.

These considerations lead to a solution of time-varying parameters 245. At startup, when the state vector is only inaccurately known, large R and Q along with large initial P are supplied. R and Q, however, comprise a component that is allowed to decay exponentially, leaving only the component that better reflects the real noises of the system. For example, the time dependence of R and Q may take the form:

$$R_k^{dec} = R_{k-1}^{dec} e^{\frac{T_k - T_{k-1}}{\tau_{decay}}} \quad (22)$$
$$R_k = R_k^{dec} + R^{inf}$$
$$Q_k^{dec} = Q_{k-1}^{dec} e^{\frac{T_k - T_{k-1}}{\tau_{decay}}}$$
$$Q_k = Q_k^{dec} + Q^{inf}$$

P, of course, gradually decays as a result of the Ricatti solution. R and Q may be allowed to decay with a time constant of several hundred milliseconds in order to allow successful and smooth transition front acquisition into tracking when no information about the state vector is initially available.

Use of Self-calibration

The precision of the tracking based on equations (7)–(15) depends upon precise knowledge of the pose of all the transmitters. The five-coordinate pose of each transmitter is preferably known along with its intensity and radius. The pose is used to compute the dipole magnetic field, the intensity contributes to the proportionality factor $C_0$, and the radius is used in order to compute the correction to the dipole term in equation (19). Each of these parameters may be directly measured producing successful calibration. In practice, a precise calibration is tedious and sometimes limited, e.g. measuring the physical dimensions of an electric coil encased within a plastic protection shield is difficult. Moreover, almost every parameter is suibject to some variance due to temperature changes. Thus, it is desirable to provide the system with a gross calibration, and allow it to fine-tune the parameters automatically.

In the calibration of the proportionality coefficient $C_0$, a direct measure of $C_0$ is possible. The higher the desired accuracy, the more time consuming is the experiment. Alternatively, a state member $C_i$ for each transmitter may be added, and a new Kalman filter built that optimizes these parameters. The new state vector preferably takes the form:

$$\xi = [x, y, z, \phi, \theta, \dot{x}, \dot{y}, \dot{z}, \dot{\phi}, \dot{\theta}, C_1 \ldots, C_N] \quad (23)$$

N=number of transmitters

When the state vector is augmented, the matrices $P_0$, Q and $\Phi$ are also preferably augmented:

$$Q = \begin{bmatrix} Q_{coor} & 0 \\ 0 & Q_{sc} \end{bmatrix} \quad (24)$$

where $Q_{coor}$ is the matrix defined as Q above, and $Q_{sc}$ is the self-calibration process-noise covariance-matrix. This matrix may be computed from the maximal allowed rate of change of the coefficients $C_0$ or may be set to zero if a constant calibration is sought. The state transition matrix would take the form:

$$\Phi = \begin{bmatrix} \Phi_{coor} & 0 \\ 0 & \Phi_{sc} \end{bmatrix} \quad (25)$$

where $\Phi_{coor}$ is the matrix defined as $\Phi$ above, and $\Phi_{sc}$ is the coefficients transition matrix. This latter part typically equals the unity matrix unless a time derivative of the coefficients $C_0$ is included in the state.

The matrices K and H are also preferably augmented. To this end the derivative of $h(\cdot)$ with respect to the new state members is typically required. The derivative may be analytically or numerically computed from equations (16), (17) and (18), depending upon which is more convenient or computittionally faster. The sub-matrix of $P_0$ depends on the csize of calibration uncertainty. For the example of self-calibrating the coefficients $C_0$, the H matrix takes the form:

$$H_k = [H_{coor}, H_{sc}]$$

$$H_{sc} = \begin{bmatrix} h_{C,k}^1 & 0 & 0 & 0 & 0 & 0 & 0 & 0 & 0 \\ 0 & h_{C,k}^2 & 0 & 0 & 0 & 0 & 0 & 0 & 0 \\ 0 & 0 & h_{C,k}^3 & 0 & 0 & 0 & 0 & 0 & 0 \\ 0 & 0 & 0 & h_{C,k}^4 & 0 & 0 & 0 & 0 & 0 \\ 0 & 0 & 0 & 0 & h_{C,k}^5 & 0 & 0 & 0 & 0 \\ 0 & 0 & 0 & 0 & 0 & h_{C,k}^6 & 0 & 0 & 0 \\ 0 & 0 & 0 & 0 & 0 & 0 & h_{C,k}^7 & 0 & 0 \\ 0 & 0 & 0 & 0 & 0 & 0 & 0 & h_{C,k}^8 & 0 \\ 0 & 0 & 0 & 0 & 0 & 0 & 0 & 0 & h_{C,k}^9 \end{bmatrix} \quad (26)$$

$$h_{C,k}^s = \left.\frac{\partial h^s(\xi)}{\partial C_0^s}\right|_{\xi_k(-)} = \frac{h^s[\xi_k(-)]}{C_0^s}; \quad C_0^s = \text{coefficient of transmitter } s$$

Similarly, one may add state members for calibration of other parameters. For example, considering the $\phi$ orientation of the sources:

$$\xi = [x, y, z, \phi, \theta, \dot{x}, \dot{y}, \dot{z}, \dot{\phi}, \dot{\theta}, \phi_1^s, \ldots, \phi_N^s] \quad (27)$$

$\phi_i^s = \phi$ coordinate of transmitter i

N=number of transmitters or any combination of calibration parameters. For each combination, the matrices $P_0$, Q and $\Phi$, are preferably accordingly built.

when self-calibration is used, tbe system's knowledge of the transmitters' calibration data is preferably updated using the state vector 255. Preferably, this update takes place after every iteration. However, a slower update rate may be used if only small updates are expected.

Using an Adaptive Kalman Filter

A deterministic time-decay of filter parameters may be generalized into an adaptive approach. For example, one may cstimate the matrices Q and R from the results of the tracking, leading to an adaptive Q and R. In this example, the matrix Q describes every kinetic component that is not modelcd by the equations of motion, modeling it as a white noise.

For example, when the state vector of equation (3) is used, the second time derivative, i.e., acceleration, is presumably included within Q as a process noise. Usually, this matrix is assigned a value based on a worst-case scenario. The highest acceleration expected would be based to estimate Q. This choice is not always optimal as a large Q leads to a large steady state P and a noise-sensitive filter. On the other hand, a small Q may result in overlooking quick pose changes.

In the state-vector example of equation (3) an adaptive estimation 250 may take the following form:

$$Q_k^{acc} = \alpha \left( \frac{\xi_k^{velocity}(+) - \xi_{k-1}^{velocity}(+)}{T_k - T_{k-1}} \right)^2 + (1-\alpha) Q_{k-1}^{acc}$$

$$Q_k = Q_k^{acc} + Q_0^{acc}$$

$$\zeta_k^{velocity}(+) = \text{estimate of } \{\dot{x}, \dot{y}, \dot{z}, \dot{\phi}, \dot{\theta}\} \quad (28)$$

where $Q^{acc}$ denotes the components of Q that correspond to the highest time derivative appearing in the state vector, i.e., the velocity. The squared term is an estimate of the detector's acceleration. The constant $\alpha$ is a gain factor–the higher the gain, the shorter the period over which the acceleration-estimate is averaged. The term $Q_0^{acc}$ is a constant, time-independent term.

Similarly, the matrix R preferably benefits from an adaptive approach 250. When R is too large the system only slowly responds to a detector's change of course. When R is too small the filter may diverge. Since this matrix models the effects that are not included in the physical model of the system as a white noise, its adaptation depends on the innovations $\{\zeta_k - h[\zeta_k(-)]\}$:

$$R_k^{s,s} = \beta \{\zeta_k^s - h^s[\zeta_k(-)]\}^2 + (1-\beta) R_{k-1}^{s,s}$$

$$R_k = R_k^{s,s} + R_0^{s,s} \quad (29)$$

where the notations are similar to those of equation (28), and the superscript s denotes the transmitter whose measurement noise covariance is computed. The term $R_o^{acc}$ is a constant, time-independent term.

In the present specification, the superscript "t" or "T" associated with a matrix denotes the matrix's transpose.

The preferred embodiment of the present invention described hereinabove considers only an EKF, i.e., first order approximation to an optimal non-linear filter. Improved filters (e.g. as described in Kushner, 1967), including second order EKF and Gaussian filters (both described in Jazwinski, 1970) and Gaussian sum filters (described in Anderson and Moore, 1979), and other versions of the known approximations can easily be applied in alternative embodiments of the present invention, and their derivation is straightforward.

It is appreciated that the software components of the present invention may, if desired, be implemented in ROM (read-oinly memory) form. The software components may, generally, be implemented in hardware, if desired, using conventional techniques.

It is appreciated that various features of the invention which, for clarity, are described in the contexts of separate embodime nts may also be provided in combination in a single embodiment. Conversely, various features of the invention which are, for brevity, described in the context of a single embodiment may also be provided separately or in any suitable sub-combination.

Persons skilled in the art will appreciate that the present invention is not limited to what has been particularly shown and described herein above. Rather, the scope of the present invention is defined only by the claims that follow.

What is claimed is:

1. A pose tracking apparatus operative to track the pose of a moving object based on magnetic flux measurements taken in the vicinity of the moving object, the pose tracking apparatus comprising:

a non-linear Kalman filter-based tracker operative to receive magnetic flux measurements performed in the vicinity of the moving object, and to operate a non-linear Kalman-type filter on said measurements, thereby to generate information regarding the pose of the moving object; and a pose indicator operative to provide an output indication of said information regarding the pose of the moving object, wherein the non-linear tracker employs a Biot-Savart transformation from the pose of the moving object to the magnetic flux measurements taken in its vicinity, and wherein employing the Biot-Savart transformation comprises computing a function h of a state vector, as follows:

$$h(\xi) = \frac{C_0}{R^3} \left( \frac{3 A_1 A_2}{R^2} - A_3 \right)$$

where $C_0$ is a coefficient,

R is the distance between a detector detecting the magnetic flux measurements within a transmitter array, and a transmitter inducing a magnetic flux sampled by said measurements, and $A_1 = \delta x \sin(\theta_s) \cos(\phi_s) + \delta y \sin(\theta_s) \sin(\phi_s) + \delta z \cos(\theta_s)$ $A_2 = \delta x \sin(\theta_d) \cos(\phi_d) + \delta y \sin(\theta_d) \sin(\phi_d) + \delta z \cos(\theta_d)$ $A_3 = \sin(\theta_s) \cos(\phi_s) \sin(\theta_d) \cos(\phi_d) + \sin(\theta_s) \sin(\phi_s) \sin(\theta_d) \sin(\phi_d) + \cos(\phi_s) \cos(\phi_d)$ and wherein the pose of the detector is $(x_d, y_d, z_d, \theta_d, \phi_d)$ and the pose of the transmitter is $(x_s, y_s, z_s, \theta_s, \phi_s)$, and where $\delta x$, $\delta y$ and $\delta z$ denote the distance between the x, y and z components, respectively, of the detector's pose and the transmitter's pose.

2. Apparatus according to claim 1 wherein said non-linear tracker comprises an EKF (extended Kalman filter) tracker.

3. Apparatus according to claim 1 wherein the non-linear filter operates on a state vector whose components include pose coordinates and first time-derivatives of the pose coordinates.

4. Apparatus according to claim 3 wherein the pose coordinates comprise 3 spatial coordinates and 2 orientation coordinates.

5. An apparatus according to claim 1 wherein the non-linear tracker approximates an elliptic integral, at least when the moving object is close to a transmitter within a transmitter array inducing magnetic flux in the vicinity of the moving object, by computing first and second terms of a Taylor series representing the elliptic intgral.

6. Apparatus according to claim 1 and also comprising a transmitter array, comprising less than six operative transmitters, inducing magnetic flux in the vicinity of the moving object.

7. An apparatus according to claim 1 wherein the non-linear filter employs the following matrices and operations:

$$\xi_k(-) = \Phi \xi_{k-1}(+)$$

where k is a time index, $\xi_k(-)$ is a state vector predictor, $\xi_k(+)$ is a state vector corrector, and $\Phi$ is a state transition matrix, $$P_k(-) = \Phi P_{k-1}(+) \Phi^T + Q$$

where P(−) is an estimate error covariance matrix predictor, P(+) is an estimate error covariance matrix corrector and Q is a process noise covariance matrix, $$H_k = \left.\frac{\partial h(\vec{\xi})}{\partial \vec{\xi}}\right|_{\xi_k(-)}$$

where h is a sensitivity function and $\xi$ is a state vector, $$K_k = P_k(-)H_k^T[H_kP_k(-)H_k^T+R_k]^{-1}$$

where $R_k$ is a measurement noise covariance matrix, $$\xi_k(+) = \xi_k(-) + K_k\{\zeta_k - h[\xi_k(-)]\}$$

where $\zeta$ denotes said magnetic flux measurements taken in the vicinity of the moving object, and $$P_k(+) = [I - K_k H_k] P_k(-)$$

8. An apparatus according to claim 1 wherein the non-linear tracker employs an at least approximated Biot-Savart transformation from the pose of the moving object and from the poses of an array of magnetic transmitters inducing a magnetic flux sampled by said measurements, to the magnetic flux measurements.

9. An apparatus according to claim 8 where said at least approximated Biot-Savart transformation comprises an approximated Biot-Savart transformation.

10. Apparatus according to claim 1 wherein the non-linear tracker is operative to compute a sensitivity function h of a state vector $\xi$, as follows:

$$h(\xi) = \frac{C_0}{R^3}\left(\frac{3A_1A_2}{R^2} - A_3\right)$$

wiere $C_0$ is a coefficient, R is the distance between a detector detecting the magnetic flux measurements and a transmitter inducing a magnetic flux sampled by said measurements and wherein $$A_1 = \delta x \sin(\theta_s)\cos(\phi_s) + \delta \sin(\theta_s)\sin(\phi_s) + \delta z \cos(\theta_s)$$

$$A_2 = \delta x \sin(\theta_d)\cos(\theta_d) + \delta \sin(\phi_d)\sin(\theta_d) + \delta z \cos(\theta_d)$$

$$A_3 = \sin(\theta_s)\cos(\phi_s)\sin(\theta_d)\cos(\phi_d) + \sin(\theta_s)\sin(\phi_s)\sin(\theta_d)\sin(\phi_d) + \cos(\phi_s)\cos(\phi_d)$$

and wherein the pose of the detector is $(x_d, y_d, z_d, \theta_d, \phi_d)$ and the pose of the transmitter is $(x_s, y_s, z_s, \theta_s, \phi_s)$, and where $\delta x$, $\delta y$ and $\delta z$ denote the distance between the x, y and z components, respectively, of the detector's pose and the transmitter's pose.

11. Apparatus according to claim 1 wherein the non-linear tracker is operative to compute an approximated elliptic integral, at least when the moving object is close to a transmitter inducing a magnetic flux sampled by said measurements, by computing first and second terms of a Taylor series representing the elliptic integral.

12. Apparatus according to claim 11 where said approximated elliptic integral comprises $$A_1 \rightarrow A_1(1-\delta)$$

$$A_3 \rightarrow A_3(1-\eta)$$

$$\delta = \frac{5}{8}\left(\frac{\rho}{R}\right)^2\left(7\frac{A_1^2}{R^2} - 3\right)$$

$$\eta = \frac{9}{8}\left(\frac{\rho}{R}\right)^2\left(5\frac{A_1^2}{R^2} - 1\right)$$

and where $\rho$ is the radius of the transmitter.

13. Apparatus according to claim 1 where said magnetic flux measurements comprise less than six magnetic flux measurements in the vicinity of the moving object.

14. Apparatus according to claim 1 wherein an orientation component of the pose of the moving object is represented by two angles continuous over time $\theta'$ and $\phi'$, whose relationship with conventional polar coordinates $\theta$ and $\phi$ is as follows:

$$\theta = \begin{cases} \theta' & \text{if } \mod(\theta, 2\pi) \leq \pi \\ -\theta' & \text{if } \mod(\theta, 2\pi) > \pi \end{cases}$$

$$\varphi = \begin{cases} \varphi' & \text{if } \theta = \theta' \\ \varphi' + \pi & \text{if } \theta = -\theta'. \end{cases}$$

15. Apparatus according to claim 1 where the non-linear tracker uses a dynamic offset of an orientation component of the moving object's pose, in order to avoid singularity.

16. Apparatus according to claim 15 where the dynamic offset is described by the following transformation:

$$\theta = \cos^{-1}[\cos(\theta')\cos(\phi')]$$

$$\phi = \cos^{-1}[\sqrt{\cos^2(\theta) + \sin^2(\phi')\cos^2(\theta')}]$$

where $\theta$ and $\phi$ comprise an orientation component of the moving object's pose after the dynamic offset, and $\theta'$ and $\phi'$ comprise the orientation component of the moving object's pose before the dynamic offset.

17. Apparatus according to claim 1 and wherein the non-linear tracker is operative to time-vary a measurement noise covariance matrix R and a process noise covariance matrix Q.

18. Apparatus according to claim 17 where the time-varying of R and Q comprises:

$$R_k^{dec} = R_{k-1}^{dec} e^{\frac{T_k - T_{k-1}}{\tau_{decay}}}$$

$$R_k = R_k^{dec} + R^{inf}$$

$$Q_k^{dec} = Q_{k-1}^{dec} e^{\frac{T_k - T_{k-1}}{\tau_{decay}}}$$

$$Q_k = Q_k^{dec} + Q^{inf}.$$

19. A system according to claim 1 and also comprising at least one self-calibrated transmitters inducing a magnetic flux sampled by said measurements.

20. A system according to claim 19 wherein the non-linear filter is operative to calibrate the location of each of said self-calibrating transmitters.

21. A system according to claim 19 wherein the non-linear filter is operative to calibrate the intensity of each of said self-calibrating transmitters.

22. A system according to claim 19 wherein the non-linear filter is operative to calibrate the radius of each of said self-calibrating transmitters.

23. A system according to claim 19 wherein the non-linear filter is operative to calibrate the orientation of each of said self-calibrating transmitters.

24. Apparatus according to claim 19 wherein the tracker uses a state vector whose components comprise characteristics of said self-calibrated transmitters, and wherein at least one of the characteristics is self-calibrated.

25. Apparatus according to claim 1 wherein the non-linear tracker employs a measurement noise matrix R and a process noise covariance matrix Q at least one of which is generated by an adaptive process.

26. Apparatus according to claim 25 where the adaptive process for Q comprises $$Q_k^{acc} = \alpha\left(\frac{\xi_k^{velocity}(+) - \xi_{k-1}^{velocity}(+)}{T_k - T_{k-1}}\right)^2 + (1-\alpha)Q_{k-1}^{acc}$$

$$Q_k = Q_k^{acc} + Q_0^{acc}$$

$\xi_k^{velocity}(+) = $ estimate of $\{\dot{x}, \dot{y}, \dot{z}, \dot{\phi}, \dot{\theta}\}$ 27. Apparatus according to claim 26 where the adaptive process for R comprises $$R_k^{s,s} = \beta\{\zeta_k^s - h^s[\xi_k(-)]\}^2 + (1-\beta)R_{k-1}^{s,s}$$

$$R_k = R_k^{s,s} + R_0^{s,s}$$

28. Apparatus according to claim 25 where the adaptive process for R comprises $$R_k^{s,s} = \beta\{\zeta_k^s - h^s[\xi_k(-)]\}^2 + (1-\beta)R_{k-1}^{s,s}$$

$$R_k = R_k^{s,s} + R_0^{s,s}$$

29. A method for tracking the pose of a moving object based on magnetic flux measurements taken in the vicinity of the moving object, the method comprising:

receiving magnetic flux measurements performed in the vicinity of the moving object, and operating a non-linear Kalman-type filter on said measurements, thereby generating information regarding the pose of the moving object; and providing an output indication of said information regarding the pose of the moving object, wherein said receiving step comprises employing a Biot-Savart transformation from the pose of the moving object to the magnetic flux measurements taken in its vicinity, and wherein employing the Biot-Savart transformation comprises comnuting a function h of a state vector, as follows:

$$h(\xi) = \frac{C_0}{R^3}\left(\frac{3A_1A_2}{R^2} - A_3\right)$$

where $C_0$ is a coefficient,

R is the distance between a detector detecting the magnetic flux measurements within a transmitter array, and a transmitter inducing a magnetic flux sampled by said measurements, and $A_1 = \delta x \sin(\theta_s)\cos(\phi_s) + \delta y \sin(\theta_s)\sin(\phi_s) + \delta z \cos(\theta_s)$ $A_2 = \delta x \sin(\theta_d)\cos(\phi_d) + \delta y \sin(\theta_d)\sin(\phi_d) + \delta z \cos(\theta_d)$ $A_3 = \sin(\theta_s)\cos(\phi_s)\sin(\theta_d)\cos(\phi_d) + \sin(\theta_s)\sin(\phi_s)\sin(\theta_d)\sin(\phi_d) + \cos(\phi_s)\cos(\phi_d)$ and wherein the pose of the detector is $(x_d, y_d, z_d, \theta_d, \phi_d)$ and the pose of the transmitter is $(x_s, y_s, z_s, \theta_s, \phi_s)$, and where $\delta x$, $\delta y$ and $\delta z$ denote the distance between the x, y and z components, respectively, of the detector's pose and the transmitter's pose.

30. A pose tracking apparatus operative to track the pose of a moving object based on magnetic flux measurements taken in the vicinity of the moving object, the pose tracking apparatus comprising:

a non-linear Kalman filter-based tracker operative to receive magnetic flux measurements performed in the vicinity of the moving object, and to operate a non-linear Kalman-type filter on said measurements, thereby to generate information regarding the pose of the moving object; and a pose indicator operative to provide an output indication of said information regarding the pose of the moving object, wherein the non-linear tracker approximates an elliptic integral, at least when the moving object is close to a transmitter within a transmitter array inducing magnetic flux in the vicinity of the moving object, by computing first and second terms of a Taylor series representing the elliptic integral.

31. An apparatus according to claim 30 wherein the non-linear filter employs the following matrices and operations:

$$\xi_k(-) = \Phi\xi_{k-1}(+)$$

where k is a time index, $\xi_k(-)$ is a state vector predictor, $\xi_k(+)$ is a state vector corrector, and $\Phi$ is a state transition matrix, $$P_k(-) = \Phi P_{k-1}(+)\Phi^T + Q$$

where P(−) is an estimate error covariance matrix predictor, P(+) is an estimate error covariance matrix corrector and Q is a process noise covariance matrix, $$H_k = \left.\frac{\partial h(\vec{\xi})}{\partial \vec{\xi}}\right|_{\xi_k(-)}$$

where h is a sensitivity function and $\xi$ is a state vector, $$K_k = P_k(-)H_k^T[H_kP_k(-)H_k^T + R_k]^{-1}$$

where $R_k$ is a measurement noise covariance matrix, $$\xi_k(+) = \xi_k(-) + K_k\{\zeta_k - h[\xi_k(-)]\}$$

where $\zeta$ denotes said magnetic flux measurements taken in the vicinity of the moving object, and $$P_k(+) = [I - K_kH_k]P_k(-)$$

32. An apparatus according to claim 30 wherein the non-linear tracker is operative to compute a sensitivity function h of a state vector $\xi$, as follows:

$$h(\xi) = \frac{C_0}{R^3}\left(\frac{3A_1A_2}{R^2} - A_3\right)$$

where $C_0$ is a coefficient, R is the distance between a detector detecting the magnetic flux measurements and a transmitter inducing a magnetic flux sampled by said measurements and wherein $A_1 = \delta x \sin(\theta_s)\cos(\phi_s) + \delta y \sin(\theta_s)\sin(\phi_s) + \delta z \cos(\theta_s)$ $$A_2 = \delta x \sin(\theta_d)\cos(\phi_d) + \delta y \sin(\theta_d)\sin(\phi_d) + \delta z \cos(\theta_d)$$

$$A_3 = \sin(\theta_s)\cos(\phi_s)\sin(\theta_d)\cos(\phi_d) + \sin(\theta_s)\sin(\phi_s)\sin(\theta_d)\sin(\phi_d) + \cos(\phi_s)\cos(\phi_d)$$

and wherein the pose of the detector is $(x_d, y_d, z_d, \theta_d, \phi_d)$ and the pose of the transmitter is $(x_s, y_s, z_s, \theta_s, \phi_s)$, and where $\delta x$, $\delta y$ and $\delta z$ denote the distance between the x, y and z components, respectively, of the detector's pose and the transmitter's pose.

33. An apparatus according to claim 30 wherein the non-linear tracker is operative to compute an approximated elliptic integral, at least when the moving object is close to a transmitter inducing a magnetic flux sampled by said measurements, by computing first and second terms of a Taylor series representing the elliptic integral, where said approximated elliptic integral comprises $$A_1 \rightarrow A_1(1-\delta)$$

$$A_3 \rightarrow A_3(1-\eta)$$

$$\delta = \frac{5}{8}\left(\frac{\rho}{R}\right)^2 \left(7\frac{A_1^2}{R^2} - 3\right)$$

$$\eta = \frac{9}{8}\left(\frac{\rho}{R}\right)^2 \left(5\frac{A_1^2}{R^2} - 1\right)$$

and where $\rho$ is the radius of the transmitter.

34. An apparatus according to claim 30 wherein an orientation component of the pose of the moving object is represented by two angles continuous over time $\theta'$ and $\phi'$, whose relationship with conventional polar coordinates $\theta$ and $\phi$ is as follows:

$$\theta = \begin{cases} \theta' & \text{if } \text{mod}(\theta, 2\pi) \leq \pi \\ -\theta' & \text{if } \text{mod}(\theta, 2\pi) > \pi \end{cases}$$

$$\varphi = \begin{cases} \varphi' & \text{if } \theta = \theta' \\ \varphi' + \pi & \text{if } \theta = -\theta'. \end{cases}$$

35. An apparatus according to claim 30 where the non-linear tracker uses a dynamic offset of an orientation component of the moving object's pose, in order to avoid singularity.

36. An apparatus according to claim 30 and wherein the non-linear tracker is operative to time-vary a measurement noise covariance matrix R and a process noise covariance matrix Q.

37. A system according to claim 30 and also comprising at least one self-calibrated transmitter inducing a magnetic flux sampled by said measurements.

38. An apparatus according to claim 30 wherein the non-linear tracker employs a measurement noise matrix R and a process noise covariance matrix Q at least one of which is generated by an adaptive process.

39. A pose tracking apparatus operative to track the pose of a moving object based on magnetic flux measurements taken in the vicinity of the moving object, the pose tracking apparatus comprising:

a non-linear Kalman filter-based tracker operative to receive magnetic flux measurements performed in the vicinity of the moving object, and to operate a non-linear Kalman-type filter on said measurements, thereby to generate information regarding the pose of the moving object; and a pose indicator operative to provide an output indication of said information regarding the pose of the moving object, wherein the non-linear filter employs the following matrices and operations:

$$\xi_k(-) = \Phi \xi_{k-1}(+)$$

where k is a time index, $\xi_k(-)$ is a state vector predictor, $\xi_k(+)$ is a state vector corrector, and $\Phi$ is a state transition matrix, $$P_k(-) = \Phi P_{k-1}(+)\Phi^T + Q$$

where $P(-)$ is an estimate error covariance matrix predictor, $P(+)$ is an estimate error covariance matrix corrector and Q is a process noise covariance matrix, $$H_k = \left.\frac{\partial h(\vec{\xi})}{\partial \vec{\xi}}\right|_{\xi_k(-)}$$

where h is a sensitivity function and $\xi$ is a state vector, $$K_k = P_k(-)H_k^T[H_k P_k(-)H_k^T + R_k]^{-1}$$

where $R_k$ is a measurement noise covariance matrix, $$\xi_k(+) = \xi_k(-) + K_k\{\zeta_k - h[\xi_k(-)]\}$$

where $\zeta$ denotes said magnetic flux measurements taken in the vicinity of the moving object, and $$P_k(+) = [I - K_k H_k]P_k(-)$$

40. An apparatus according to claim 39 wherein the non-linear tracker perative to compute a sensitivity function h of a state vector $\xi$, as follows:

$$h(\xi) = \frac{C_0}{R^3}\left(\frac{3A_1 A_2}{R^2} - A_3\right)$$

where $C_0$ is a coefficient, R is the distance between a detector detecting the magnetic flux measurements and a transmitter inducing a magnetic flux sampled by said measurements and wherein $$A_1 = \delta x \sin(\theta_s)\cos(\phi_s) + \delta y \sin(\theta_s)\sin(\phi_s) + \delta z \cos(\theta_s)$$

$$A_2 = \delta x \sin(\theta_d)\cos(\phi_d) + \delta y \sin(\theta_d)\sin(\phi_d) + \delta z \cos(\theta_d)$$

$$A_3 = \sin(\theta_s)\cos(\phi_s)\sin(\theta_d)\cos(\phi_d) + \sin(\theta_s)\sin(\phi_s)\sin(\theta_d)\sin(\phi_d) + \cos(\phi_s)\cos(\phi_d)$$

and wherein the pose of the detector is $(x_d, y_d, z_d, \theta_d, \phi_d)$ and the pose of the transmitter is $(x_s, y_s, z_s, \theta_s, \phi_s)$, and where $\delta x$, $\delta y$ and $\delta z$ denote the distance between the x, y and z components, respectively, of the detector's pose and the transmitter's pose.

41. An apparatus according to claim 39 wherein the non-linear tracker is operative to compute an approximated elliptic integral, at least when the moving object is close to a transmitter inducing a magnetic flux sampled by said measurements, by computing first and second terms of a Taylor series representing the elliptic integral, where said approximated elliptic integral comprises $$A_1 \rightarrow A_1(1-\delta)$$

$$A_3 \rightarrow A_3(1-\eta)$$

$$\delta = \frac{5}{8}\left(\frac{\rho}{R}\right)^2\left(7\frac{A_1^2}{R^2} - 3\right)$$

$$\eta = \frac{9}{8}\left(\frac{\rho}{R}\right)^2\left(5\frac{A_1^2}{R^2} - 1\right)$$

and where ρ is the radius of the transmitter.

42. An apparatus according to claim 39 wherein an orientation component of the pose of the moving object is represented by two angles continuous over time θ' and φ', whose relationship with conventional polar coordinates θ and φ is as follows:

$$\theta = \begin{cases} \theta' & \text{if } \mod(\theta, 2\pi) \leq \pi \\ -\theta' & \text{if } \mod(\theta, 2\pi) > \pi \end{cases}$$

$$\varphi = \begin{cases} \varphi' & \text{if } \theta = \theta' \\ \varphi' + \pi & \text{if } \theta = -\theta'. \end{cases}$$

43. An apparatus according to claim 39 where the non-linear tracker uses a dynamic offset of an orientation component of the moving object's pose, in order to avoid singularity.

44. An apparatus according to claim 39 and wherein the non-linear tracker is operative to time-vary a measurement noise covariance matrix R and a process noise covariance matrix Q.

45. A system according to claim 39 and also comprising at least one self-calibrated transmitter inducing a magnetic flux sampled by said measurements.

46. An apparatus according to claim 39 wherein the non-linear tracker employs a measurement noise matrix R and a process noise covariance matrix Q at least one of which is generated by an adaptive process.

47. A pose tracking apparatus operative to track the pose of a moving object based on magnetic flux measurements taken in the vicinity of the moving object, the pose tracking apparatus comprising:

a non-linear Kalman filter-based tracker operative to receive magnetic flux measurements performed in the vicinity of the moving object, and to operate a non-linear Kalman-type filter on said measurements, thereby to generate information regarding the pose of the moving object; and a pose indicator operative to provide an output indication of said information regarding the pose of the moving object, wherein said non-linear tracker is operative to compute a sensitivity function h of a state vector ξ, as follows:

$$h(\xi) = \frac{C_0}{R^3}\left(\frac{3A_1 A_2}{R^2} - A_3\right)$$

where $C_0$ is a coefficient, R is the distance between a detector detecting the magnetic flux measurements and a transmitter inducing a magnetic flux sampled by said measurements and wherein $A_1 = \delta x \sin(\theta_s)\cos(\phi_s) + \delta y \sin(\theta_s)\sin(\phi_s) + \delta z \cos(\theta_s)$ $A_2 = \delta x \sin(\theta_d)\cos(\phi_d) + \delta y \sin(\theta_d)\sin(\phi_d) + \delta z \cos(\theta_d)$ $A_3 = \sin(\theta_s)\cos(\phi_s)\sin(\theta_d)\cos(\phi_d) + \sin(\theta_s)\sin(\phi_s)\sin(\theta_d)\sin(\phi_d) + \cos(\phi_s)\cos(\phi_d)$ and wherein the pose of the detector is $(x_d, y_d, z_d, \theta_d, \phi_d)$ and the pose of the transmitter is $(x_s, y_s, z_s, \theta_s, \phi_s)$, and where δx, δy and δz denote the distance between the x, y and z components, respectively, of the detector's pose and the transmitter's pose.

48. An apparatus according to claim 47 wherein the non-linear tracker is operative to compute an approximated elliptic integral, at least when the moving object is close to a transmitter inducing a magnetic flux sampled by said measurements, by computing first and second terms of a Taylor series representing the elliptic integral, where said approximated elliptic integral comprises $A_1 \rightarrow A_1(1-\delta)$ $A_3 \rightarrow A_3(1-\eta)$ $$\delta = \frac{5}{8}\left(\frac{\rho}{R}\right)^2\left(7\frac{A_1^2}{R^2} - 3\right)$$

$$\eta = \frac{9}{8}\left(\frac{\rho}{R}\right)^2\left(5\frac{A_1^2}{R^2} - 1\right)$$

and where ρ is the radius of the transmitter.

49. An apparatus according to claim 47 wherein an orientation component of the pose of the moving object is represented by two angles continuous over time θ' and φ', whose relationship with conventional polar coordinates θ and φ is as follows:

$$\theta = \begin{cases} \theta' & \text{if } \mod(\theta, 2\pi) \leq \pi \\ -\theta' & \text{if } \mod(\theta, 2\pi) > \pi \end{cases}$$

$$\varphi = \begin{cases} \varphi' & \text{if } \theta = \theta' \\ \varphi' + \pi & \text{if } \theta = -\theta'. \end{cases}$$

50. An apparatus according to claim 47 where the non-linear tracker uses a dynamic offset of an orientation component of the moving object's pose, in order to avoid singularity.

51. An apparatus according to claim 47 and wherein the non-linear tracker is operative to time-vary a measurement noise covariance matrix R and a process noise covariance matrix Q.

52. A system according to claim 47 and also comprising at least one self-calibrated transmitter inducing a magnetic flux sampled by said measurements.

53. An apparatus according to claim 47 wherein the non-linear tracker employs a measurement noise matrix R and a process noise covariance matrix Q at least one of which is generated by an adaptive process.

54. A pose tracking apparatus operative to track the pose of a moving object based on magnetic flux measurements taken in the vicinity of the moving object, the pose tracking apparatus comprising:

a non-linear Kalman filter-based tracker operative to receive magnetic flux measurements performed in the vicinity of the moving object, and to operate a non-linear Kalman-type filter on said measurements, thereby to generate information regarding the pose of the moving object; and a pose indicator operative to provide an output indication of said information regarding the pose of the moving object, wherein said non-linear tracker is operative to compute an approximated elliptic integral, at least when the moving object is close to a transmitter inducing a magnetic flux sampled by said measurements, by computing first and second terms of a Taylor series representing the elliptic integral, where said approximated elliptic integral comprises $A_1 \rightarrow A_1(1-\delta)$ $A_3 \rightarrow A_3(1-\eta)$ $\delta = \frac{5}{8}\left(\frac{\rho}{R}\right)^2\left(7\frac{A_1^2}{R^2} - 3\right)$ $\eta = \frac{9}{8}\left(\frac{\rho}{R}\right)^2\left(5\frac{A_1^2}{R^2} - 1\right)$ and where ρ is the radius of the transmitter.

55. An apparatus according to claim 54 wherein an orientation component of the pose of the moving object is represented by two angles continuous over time θ' and φ', whose relationship with conventional polar coordinates θ and φ is as follows:

$\theta = \begin{cases} \theta' & \text{if } \mod(\theta, 2\pi) \leq \pi \\ -\theta' & \text{if } \mod(\theta, 2\pi) > \pi \end{cases}$ $\varphi = \begin{cases} \varphi' & \text{if } \theta = \theta' \\ \varphi' + \pi & \text{if } \theta = -\theta' \end{cases}$ 56. An apparatus according to claim 54 where the non-linear tracker uses a dynamic offset of an orientation component of the moving object's pose, in order to avoid singularity.

57. An apparatus according to claim 54 and wherein the non-linear tracker is operative to time-vary a measurement noise covariance matrix R and a process noise covariance matrix Q.

58. A system according to claim 54 and also comprising at least one self-calibrated transmitter inducing a magnetic flux sampled by said measurements.

59. An apparatus according to claim 54 wherein the non-linear tracker employs a measurement noise matrix R and a process noise covariance matrix Q at least one of which is generated by an adaptive process.

60. A pose tracking apparatus operative to track the pose of a moving object based on magnetic flux measurements taken in the vicinity of the moving object, the pose tracking apparatus comprising:
  a non-linear Kalman filter-based tracker operative to receive magnetic flux measurements performed in the vicinity of the moving object, and to operate a non-linear Kalman-type filter on said measurements, thereby to generate information regarding the pose of the moving object; and
  a pose indicator operative to provide an output indication of said information regarding the pose of the moving object,
  wherein an orientation component of the pose of the moving object is represented by two angles continuous over time θ' and φ', whose relationship with conventional polar coordinates θ and φ is as follows:

$\theta = \begin{cases} \theta' & \text{if } \mod(\theta, 2\pi) \leq \pi \\ -\theta' & \text{if } \mod(\theta, 2\pi) > \pi \end{cases}$ $\varphi = \begin{cases} \varphi' & \text{if } \theta = \theta' \\ \varphi' + \pi & \text{if } \theta = -\theta' \end{cases}$ 61. An apparatus according to claim 60 where the non-linear tracker uses a dynamic offset of an orientation component of the moving object's pose, in order to avoid singularity.

62. An apparatus according to claim 60 and wherein the non-linear tracker is operative to time-vary a measurement noise covariance matrix R and a process noise covariance matrix Q.

63. A system according to claim 60 and also comprising at least one self-calibrated transmitter inducing a magnetic flux sampled by said measurements.

64. An apparatus according to claim 60 wherein the non-linear tracker employs a measurement noise matrix R and a process noise covariance matrix Q at least one of which is generated by an adaptive process.

65. A pose tracking apparatus operative to track the pose of a moving object based on magnetic flux measurements taken in the vicinity of the moving object, the pose tracking apparatus comprising:
  a non-linear Kalman filter-based tracker operative to receive magnetic flux measurements performed in the vicinity of the moving object, and to operate a non-linear Kalman-type filter on said measurements, thereby to generate information regarding the pose of the moving object; and
  a pose indicator operative to provide an output indication of said information regarding the pose of the moving object,
  wherein said non-linear tracker uses a dynamic offset of an orientation component of the moving object's pose, in order to avoid singularity.

66. An apparatus according to claim 65 and wherein the non-linear tracker is operative to time-vary a measurement noise covariance matrix R and a process noise covariance matrix Q.

67. A system according to claim 65 and also comprising at least one self-calibrated transmitter inducing a magnetic flux sampled by said measurements.

68. An apparatus according to claim 65 wherein the non-linear tracker employs a measurement noise matrix R and a process noise covariance matrix Q at least one of which is generated by an adaptive process.

69. A pose tracking apparatus operative to track the pose of a moving object based on magnetic flux measurements taken in the vicinity of the moving object, the pose tracking apparatus comprising:
  a non-linear Kalman filter-based tracker operative to receive magnetic flux measurements performed in the vicinity of the moving object, and to operate a non-linear Kalman-type filter on said measurements, thereby to generate information regarding the pose of the moving object; and
  a pose indicator operative to provide an output indication of said information regarding the pose of the moving object,
  wherein the non-linear tracker is operative to time-vary a measurement noise covariance matrix R and a process noise covariance matrix Q.

70. A system according to claim 69 and also comprising at least one self-calibrated transmitter inducing a magnetic flux sampled by said measurements.

71. An apparatus according to claim 69 wherein the non-linear tracker employs a measurement noise matrix R and a process noise covariance matrix Q at least one of which is generated by an adaptive process.

72. A pose tracking apparatus operative to track the pose of a moving object based on magnetic flux measurements taken in the vicinity of the moving object, the pose tracking apparatus comprising:
- a non-linear Kalman filter-based tracker operative to receive magnetic flux measurements performed in the vicinity of the moving object, and to operate a non-linear Kalman-type filter on said measurements, thereby to generate information regarding the pose of the moving object;
- a pose indicator operative to provide an output indication of said information regarding the pose of the moving object; and
- at least one self-calibrated transmitter inducing a magnetic flux sampled by said measurements.

73. An apparatus according to claim 72 wherein the non-linear tracker employs a measurement noise matrix R and a process noise covariance matrix Q at least one of which is generated by an adaptive process.

74. A pose tracking apparatus operative to track the pose of a moving object based on magnetic flux measurements taken in the vicinity of the moving object, the pose tracking apparatus comprising:
- a non-linear Kalman filter-based tracker operative to receive magnetic flux measurements performed in the vicinity of the moving object, and to operate a non-linear Kalman-type filter on said measurements, thereby to generate information regarding the pose of the moving object; and
- a pose indicator operative to provide an output indication of said information regarding the pose of the moving object,
- wherein the non-linear tracker employs a measurement noise matrix R and a process noise covariance matrix Q at least one of which is generated by an adaptive process.

* * * * *